(12) United States Patent
Kim

(10) Patent No.: US 10,880,723 B2
(45) Date of Patent: Dec. 29, 2020

(54) METHOD AND APPARATUS FOR TRANSMITTING AND RECEIVING SHORT MESSAGE-RELATED SIGNAL IN A WIRELESS COMMUNICATION SYSTEM

(71) Applicant: LG ELECTRONICS INC., Seoul (KR)

(72) Inventor: Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/373,173

(22) Filed: Apr. 2, 2019

(65) Prior Publication Data
US 2019/0306695 A1  Oct. 3, 2019

(30) Foreign Application Priority Data

Apr. 2, 2018  (KR) ......................... 10-2018-0038009

(51) Int. Cl.
| | | |
|---|---|---|
| *H04W 8/12* | (2009.01) | |
| *H04W 4/14* | (2009.01) | |
| *H04W 8/04* | (2009.01) | |
| *H04W 48/00* | (2009.01) | |
| *H04W 84/04* | (2009.01) | |

(52) U.S. Cl.
CPC ............... *H04W 8/12* (2013.01); *H04W 4/14* (2013.01); *H04W 8/04* (2013.01); *H04W 48/17* (2013.01); *H04W 84/042* (2013.01)

(58) Field of Classification Search
CPC ........ H04W 4/14; H04W 8/18; H04L 65/1016
See application file for complete search history.

(56) References Cited

U.S. PATENT DOCUMENTS

| | | | | |
|---|---|---|---|---|
| 9,237,429 | B2* | 1/2016 | Xu ......................... | H04W 4/14 |
| 2006/0205404 | A1 | 9/2006 | Gonen et al. | |
| 2015/0237487 | A1 | 8/2015 | Titcombe et al. | |

OTHER PUBLICATIONS

3rd Generation Partnership Project; Technical Specification Group Services and System Aspects; "Procedures for the 5G System; Stage 2 (Release 15)", 3GPP TS 23.502 V15.1.0, Mar. 27, 2018, 287 pages.
Huawei, HiSilicon, "Addition of description on SMSF address," S2-182338, 3GPP TSG-SA WG2 Meeting #126, Montreal, Canada, Feb. 26-Mar. 2, 2018, 3 pages.
3rd Generation Partnership Project; Technical Specification Group Services and System Aspects; "System Architecture for the 5G System; Stage 2 (Release 15)," 3GPP TS 23.501 V15.1.0, Mar. 28, 2018, 203 pages.

* cited by examiner

*Primary Examiner* — Chandrahas B Patel
(74) *Attorney, Agent, or Firm* — Fish & Richardson P.C.

(57) ABSTRACT

A method of transmitting and receiving a short message (SM)-related signal by a unified data management (UDM) in a wireless communication system. The method includes: receiving, by the UDM from a short message service-gateway mobile switching center (SMS-GMSC), SM routing information that is related to an SM of a roaming user equipment (UE); and transmitting, by the UDM to a Home Short Message Service Function (H-SMSF), the SM routing information, for domain selection by the H-SMSF for delivery of the SM.

18 Claims, 20 Drawing Sheets

METHOD AND APPARATUS FOR TRANSMITTING AND RECEIVING SHORT MESSAGE-RELATED SIGNAL IN A WIRELESS COMMUNICATION SYSTEM

CROSS-REFERENCE TO RELATED APPLICATIONS

This application claims the benefit of an earlier filing date and right of priority to Korean Patent Application No. 10-2018-0038009, filed on Apr. 2, 2018, the contents of which is hereby incorporated by reference as if fully set forth herein.

TECHNICAL FIELD

The present disclosure generally relates to a wireless communication system.

BACKGROUND

Wireless communication systems have been widely deployed to provide various types of communication services such as voice or data. In some scenarios, a wireless communication system utilize a multiple access system that supports communication of multiple users by sharing available system resources (a bandwidth, transmission power, etc.) among them. Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

SUMMARY

One general aspect of the present disclosure includes a method of transmitting and receiving a short message (SM)-related signal by a unified data management (UDM) in a wireless communication system, the method including: receiving, by the UDM from a short message service-gateway mobile switching center (SMS-GMSC), SM routing information that is related to an SM of a roaming user equipment (UE); and transmitting, by the UDM to a home short message service function (H-SMSF), the SM routing information, for domain selection by the H-SMSF for delivery of the SM. Other embodiments of this aspect include corresponding computer systems, apparatus, and computer programs recorded on one or more computer storage devices, each configured to perform the actions of the methods.

Implementations may include one or more of the following features. The method where the roaming UE is attached to two or more visited public land mobile networks (PLMNs). The method where each of the two or more visited PLMNs includes a respective SMS serving entity. The method where the SMS serving entity is one of a short message service function (SMSF), an SGs mobile switching center (MSC), a mobility management entity (MME), or an IP-short message-gateway (IP-SM-GW). The method where the delivery of the SM is configured to be attempted to a target entity of a domain that is selected by the H-SMSF. The method where the target entity is one of a V-SMSF, an SGs MSC, an MME, or an IP-SM-GW. The method where the domain selection by the H-SMSF is performed according to order information that is determined by a combination of one or more of a plurality of pieces of domain order information. The method where the plurality of pieces of domain order information includes (i) an order between a circuit switched (CS) domain and a packet switched (PS) domain, (ii) an order between a user plane and a control plane, (iii) an order between an evolved packet core (EPC) and a 5th generation core (5GC), and (iv) an order between a 3rd generation partnership project (3GPP) access and a non-3GPP access. The method where the domain selection by the H-SMSF is performed according to priority information about an SMS serving entity. The method according where the SM is a mobile terminated (MT) SM. The method where the H-SMSF is assigned by the UDM in absence of a registered SMSF in a home PLMN (H-PLMN) for the roaming UE. The method where the UDM includes a home subscriber server (HSS). The method where the SM routing information is related to routing the SM to the roaming UE through an access and mobility management function (AMF). Implementations of the described techniques may include hardware, a method or process, or computer software on a computer-accessible medium.

Another general aspect of the present disclosure includes a unified data management (UDM) configured to transmit and receive a short message (SM)-related signal in a wireless communication system, the UDM including: a transceiver; at least one processor; and at least one computer memory operably connectable to the at least one processor and storing instructions that, when executed, cause the at least one processor to perform operations including: receiving, through the transceiver and from a short message service-gateway mobile switching center (SMS-GMSC), SM routing information that is related to an SM of a roaming user equipment (UE); and transmitting, through the transceiver and to a home short message service function (H-SMSF), the SM routing information, for domain selection by the H-SMSF for delivery of the SM. Other embodiments of this aspect include corresponding computer systems, apparatus, and computer programs recorded on one or more computer storage devices, each configured to perform the actions of the methods.

Implementations may include one or more of the following features. The UDM where the roaming UE is attached to two or more visited public land mobile networks (PLMNs). The UDM where each of the two or more visited PLMNs includes a respective SMS serving entity. The UDM where the SMS serving entity is one of a short message service function (SMSF), an SGs mobile switching center (MSC), a mobility management entity (MME), or an IP-short message-gateway (IP-SM-GW). The UDM where the delivery of the SM is configured to be attempted to a target entity of a domain that is selected by the H-SMSF. The UDM where the domain selection by the H-SMSF is performed according to order information that is determined by a combination of one or more of a plurality of pieces of domain order information. The UDM where the plurality of pieces of domain order information includes (i) an order between a circuit switched (CS) domain and a packet switched (PS) domain, (ii) an order between a user plane and a control plane, (iii) an order between an evolved packet core (EPC) and a 5th generation core (5GC), and (iv) an order between a 3rd generation partnership project (3GPP) access and a non-3GPP access. Implementations of the described techniques may include hardware, a method or process, or computer software on a computer-accessible medium.

It will be appreciated by persons skilled in the art that the objects that could be achieved with the present disclosure are not limited to what has been particularly described hereinabove and other objects that the present disclosure could achieve will be more clearly understood from the following detailed description.

It is to be understood that both the foregoing general description and the following detailed description of the present disclosure are exemplary and explanatory and are intended to provide further explanation of the disclosure as claimed.

DETAILED DESCRIPTION

Figure 1:
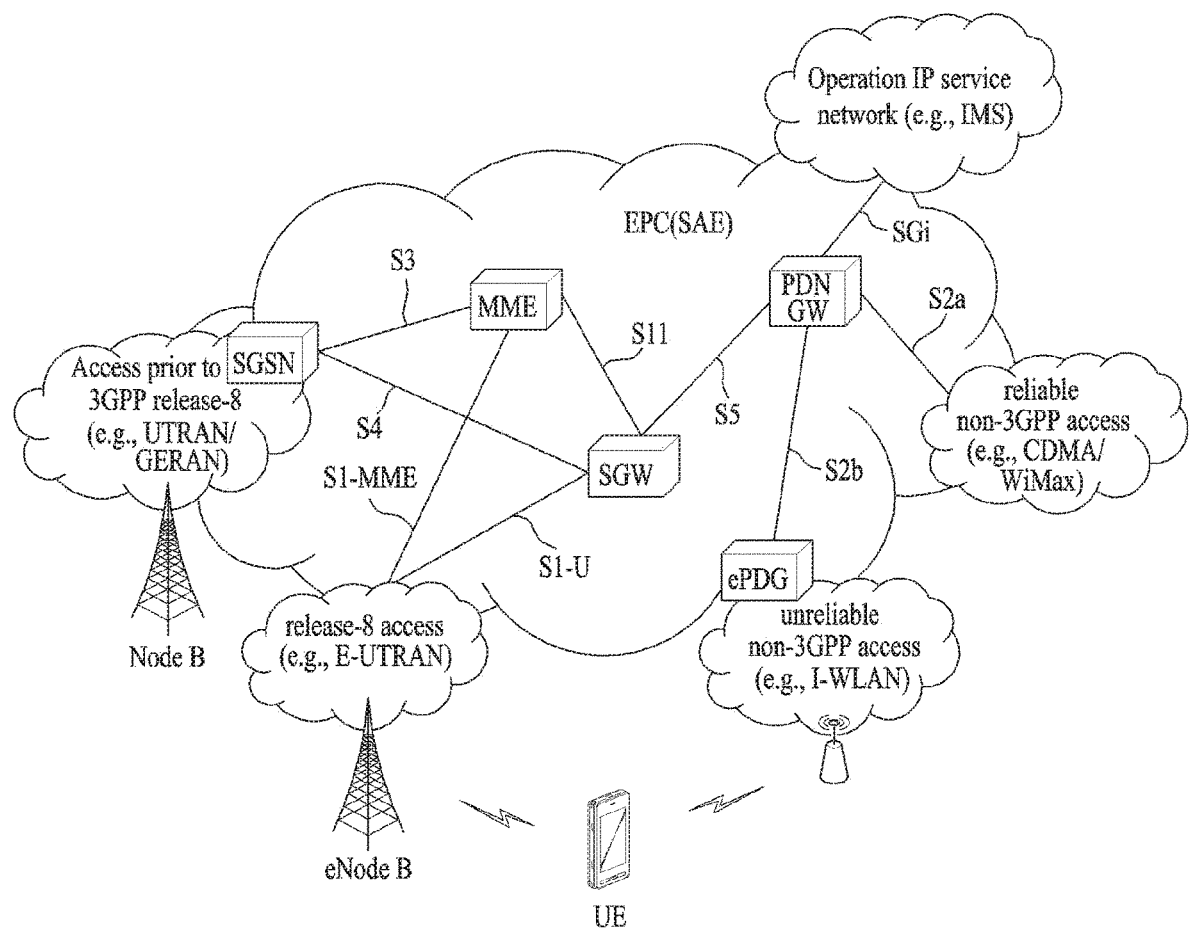
FIG. 1 is a diagram illustrating an example of the configuration of a wireless communication system.

Systems and techniques are disclosed for transmitting and receiving a short message-related signal in a wireless communication system. In some implementations, a mobile terminated (MT) short message (SM) is transmitted to a roaming user equipment (UE) which is attached to a plurality of a visited public land mobile networks (V-PLMNs).

One or more implementations of the present disclosure may comply with technical standards that are disclosed with respect to at least one of Institute of Electrical and Electronics Engineers (IEEE) 802 group system, a Third Generation Partnership Project (3GPP) system, 3GPP LTE & LTE-A system, and 3GPP2 system. For example, in some implementations, components, steps, or portions of the present disclosure may operate in compliance with the above technical standards.

Some examples of terms used in the present document are described as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network.

NodeB: a base station that is compatible with GERAN/UTRAN. This base station may, in some implementations, be installed outdoors and its coverage may have a scale of a macro cell.

eNodeB: a base station that is compatible with LTE. This base station may, in some implementations, be installed outdoors and its coverage may have a scale of a macro cell.

UE (User Equipment): the UE may alternatively be referred to as a terminal, a ME (Mobile Equipment), a MS (Mobile Station), etc. The UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station that is compatible with a UMTS network. This base station may, in some implementations, be installed indoors and its coverage may have a scale of a micro cell.

HeNB (Home eNodeB): a base station that is compatible with an EPS network. This base station may, in some implementations, be installed indoors and its coverage may have a scale of a micro cell.

MME (Mobility Management Entity): a network node that is compatible with an EPS network, which performs functions including mobility management (MM) and session management (SM).

PDN-GW (Packet Data Network-Gateway)/PGW: a network node that is compatible with an EPS network, which performs functions including UE IP address allocation, packet screening and filtering, charging data collection, etc.

SGW (Serving Gateway): a network node that is compatible with an EPS network, which performs functions including mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network (e.g., in an LTE/UMTS protocol stack), and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, which may, in some implementations, be represented as one IP address (one IPv4 address and/or one IPv6 prefix).

RAN (Radio Access Network): a unit including a Node B, an eNode B, and a Radio Network Controller (RNC)

for controlling the Node B and the eNode B in a 3GPP network, which may be implemented between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Service (or ProSe Service or Proximity-based Service): a service that enables discovery between physically proximate devices, and mutual direct communication/communication through a base station/communication through the third party. In some implementations, user plane data is exchanged through a direct data path without passing through a 3GPP core network (e.g., EPC).

EPC (Evolved Packet Core)

FIG. 1 is a diagram showing an example of the structure of a wireless communication system.

In this example, core network 100 provides core-networking technology for a wireless communication system. As an example, core network 100 may be compatible with system architecture evolution (SAE) technology to provide a network structure supporting mobility between various types of networks. For example, core network 100 may provide a packet-based system for supporting various radio access technologies and providing an enhanced data transmission capability.

In some implementations, the core network 100 may implement one or more functionalities of an evolved packet core (EPC). As such, in the example of FIG. 1, the core network 100 will also be referred to as EPC 100, for convenience of description. In some scenarios, EPC 100 implements a core network of an IP mobile communication system that is compatible with 3GPP LTE and can support real-time and non-real-time packet-based services.

In some mobile communication systems (e.g., system that are compatible with second-generation or third-generation mobile communication systems), functions of a core network may be implemented through a circuit-switched (CS) sub-domain for voice and a packet-switched (PS) sub-domain for data. However, in some systems (e.g., systems that are compatible with 3GPP LTE), CS and PS sub-domains may be unified into one IP domain. Therefore, in such systems, connection of terminals having IP capability can be established through an IP-based business station (e.g., an eNodeB (evolved Node B)), EPC, and an application domain (e.g., IMS). In such scenarios, the EPC 100 may provide a structure for end-to-end IP services.

The EPC 100 may include various components. FIG. 1 shows an example of some of the components, such as a serving gateway (SGW) 102, a packet data network gateway (PDN GW, or PGW) 104, a mobility management entity (MME) 106, a serving GPRS (general packet radio service) supporting node (SGSN) 108, and an enhanced packet data gateway (ePDG) 110.

SGW (or S-GW) 102 operates as a boundary point between a radio access network (RAN) and a core network and maintains a data path between an eNodeB, such as eNodeB 112, and the PDN GW 104. When a terminal, such as UE 114, moves over an area served by an eNodeB 112, the SGW 102 functions as a local mobility anchor point. For example, packets may be routed through the SGW 102 to provide mobility in an evolved UMTS terrestrial radio access network (E-UTRAN), such as E-UTRAN 116. As another example, the SGW 102 may serve as an anchor point for mobility of another 3GPP network (e.g., a RAN 118, which may be UTRAN or GERAN (global system for mobile communication (GSM)/enhanced data rates for global evolution (EDGE) radio access network).

The PDN GW (or PGW) 104 corresponds to a termination point of a data interface for a packet data network. The PDN GW 104 may support policy enforcement features, packet filtering and charging support. In addition, the PDN GW 104 may serve as an anchor point for mobility management with a 3GPP network and a non-3GPP network (e.g., an unreliable network 120 such as an interworking wireless local area network (I-WLAN) and a reliable network 122 such as a code division multiple access (CDMA) or WiMax network).

Although the SGW 102 and the PDN GW 104 are depicted as separate gateways in the example of the network structure of FIG. 1, the two gateways may be implemented according to a single gateway configuration in some implementations.

The MME 106 performs signaling and control functions for supporting access of a UE (e.g., UE 114) for network connection, network resource allocation, tracking, paging, roaming and handover. In some implementations, the MME 106 controls control plane functions associated with subscriber and session management. The MME 106 may manage numerous eNodeBs and signaling for selection of a gateway for handover to other networks (e.g., 2G/3G networks). In addition, the MME 106 may perform security procedures, terminal-to-network session handling, idle terminal location management, etc.

The SGSN 108 handles packet data such as mobility management and authentication of a user for other 3GPP networks (e.g., a GPRS network).

The ePDG 110 serves as a security node for a non-3GPP network (e.g., an I-WLAN, a Wi-Fi hotspot, etc.).

As described above with reference to FIG. 1, a terminal (e.g., UE 114) having IP capabilities may access a packet data network 125, such as an IP service network (e.g., an IMS) provided by an operator, via various elements in the EPC 100 not only based on 3GPP access but also based on non-3GPP access.

Additionally, FIG. 1 shows various reference points (e.g., S1-U, S1-MME, etc.). A logical link connecting two functions of different functional entities of an E-UTRAN (e.g., E-UTRAN 116) and an EPC (e.g., EPC 100) is defined as a reference point. Table 1 is a description of the reference points that are shown in FIG. 1. Fewer or more than these example reference points may be implemented, according to network structures.

TABLE 1

| Reference point | Description |
|---|---|
| S1-MME | Reference point for the control plane protocol between E-UTRAN 116 and MME 106 |
| S1-U | Reference point between E-UTRAN 116 and Serving GW 102 for per-bearer user plane tunneling and inter-eNodeB path switching during handover |
| S3 | Enables user and bearer information exchange for inter 3GPP access network mobility in idle and/or active state. This reference point can be used intra-PLMN or inter-PLMN (e.g., in the case of Inter-PLMN HO). |
| S4 | Provides related control and mobility support between GPRS Core and the 3GPP Anchor function of |

TABLE 1-continued

| Reference point | Description |
| --- | --- |
| | Serving GW. In addition, if Direct Tunnel is not established, it provides the user plane tunneling. |
| S5 | Provides user plane tunneling and tunnel management between Serving GW 102 and PDN GW 104. It is used for Serving GW 102 relocation due to UE 114 mobility and if the Serving GW 102 needs to connect to a non-collocated PDN GW 104 for PDN connectivity. |
| S11 | Reference point between MME 106 and SGW102 |
| SGi | It is the reference point between the PDN GW 104 and the packet data network 124. Packet data network may be an operator external public or private packet data network or an intra operator packet data network, e.g., for provision of IMS services . . . |

Among the reference points shown in FIG. 1, reference points S2a and S2b correspond to non-3GPP interfaces. S2a is a reference point which provides reliable non-3GPP access and related control and mobility support between PDN GWs (e.g., PDN-GW 104) to a user plane. S2b is a reference point which provides related control and mobility support between the ePDG 110 and the PDN GW 104 to the user plane.

Figure 2:
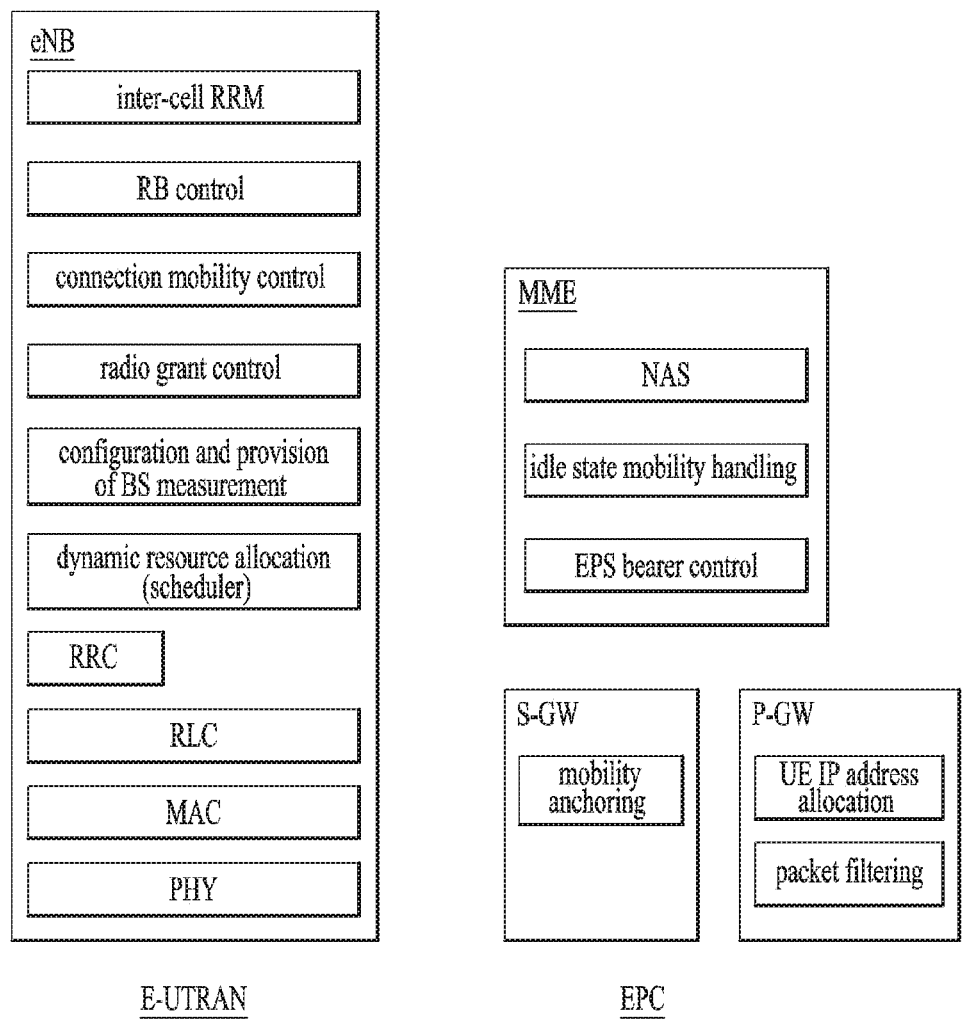
FIG. 2 is a diagram illustrating an example of the architectures of a radio access network and a core network.

FIG. 2 is a diagram illustrating an example of the architectures of a radio access network 200 and a core network 202.

In some scenarios, the radio access network 200 may implement features that are compatible with an evolved UMTS terrestrial radio access network (e.g., E-UTRAN 116 in FIG. 1). In some scenarios, the core network 202 may implement features that are compatible with an EPC (e.g., EPC 100 in FIG. 1). As such, in the discussion below, radio access network 200 is also referred to as E-UTRAN 200 and the core network 202 is also referred to EPC 202, for convenience of description.

As shown in this example, while radio resource control (RRC) connection is activated, an eNodeB 204 (e.g., eNodeB 112 in FIG. 1) may perform routing to a gateway, scheduling transmission of a paging message, scheduling and transmission of a broadcast channel (BCH), dynamic allocation of resources to a UE (e.g., UE 114 in FIG. 1) on uplink and downlink, configuration and provision of eNodeB measurement, radio bearer control, radio admission control, and connection mobility control.

In the EPC 202, an MME 206 (e.g., MME 106 in FIG. 1), an S-GW 208 (e.g., SGW 102 in FIG. 1), and a P-GW 210 (e.g., PGW 104 in FIG. 1) may perform various functions including paging generation, LTE IDLE state management, ciphering of the user plane, SAE bearer control, and ciphering and integrity protection of NAS signaling.

Figure 3:
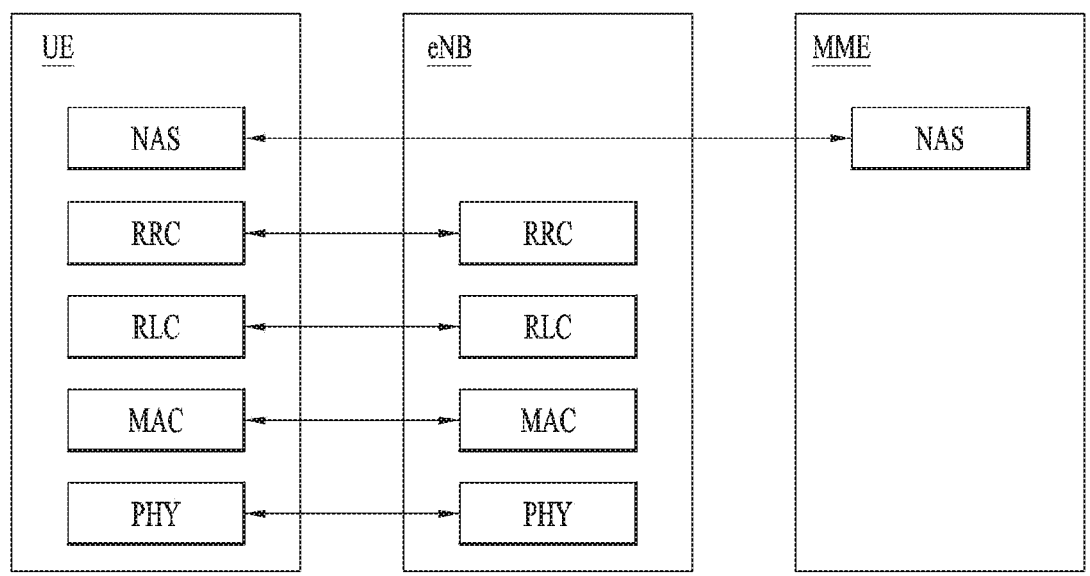
FIG. 3 is a diagram illustrating an example of the radio interface protocol architecture of a control plane.

FIG. 3 is a diagram illustrating an example of the structure of a radio interface protocol in a control plane between a UE and a base station.

Figure 4:
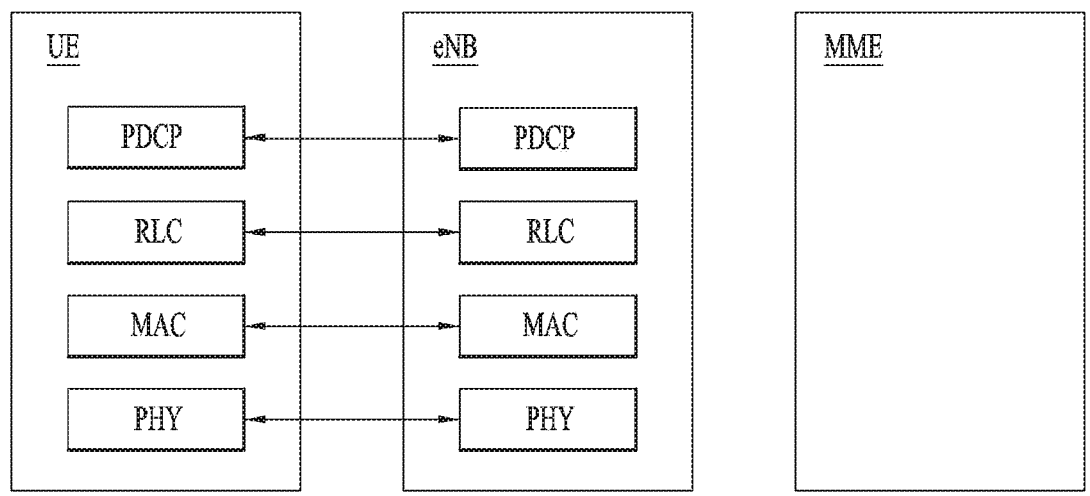
FIG. 4 is a diagram illustrating an example of the radio interface protocol architecture of a user plane.

FIG. 4 is a diagram illustrating an example of the structure of a radio interface protocol in a user plane between the UE and the base station.

In both FIGS. 3 and 4, a UE (e.g., UE 300 and UE 400) implements various layers of a protocol stack. FIG. 3 illustrates an example of such layers for a control plane, and FIG. 4 illustrates an example of such layers for a user plane. Different protocol layers of the UE may have a corresponding protocol layer in a base station (e.g., eNB 302 in FIG. 3 and eNB 402 in FIG. 4) and/or a corresponding protocol layer in a network (e.g., a network node, such as MME 304 in FIG. 3 and MME 404 in FIG. 4).

In some implementations, the radio interface protocol is based on the 3GPP wireless access network standard. The radio interface protocol includes a physical layer, a data link layer, and a networking layer. The radio interface protocol is divided into a user plane for transmission of data information and a control plane for delivering control signaling.

The protocol layers may be classified into a first layer (L1), a second layer (L2), and a third layer (L3) based on the three sublayers of the open system interconnection (OSI) model.

Hereinafter, description will be given of a radio protocol in the control plane shown in FIG. 3 and a radio protocol in the user plane shown in FIG. 4.

For both the control plane (FIG. 3) and the user plane (FIG. 4), the first layer includes a physical (PHY) layer, which provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, e.g., a physical layer of a transmitter and a physical layer of a receiver, is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols (in the time domain) and a plurality of subcarriers (in the frequency domain). A Transmission Time Interval (TTI), a unit time for data transmission, e.g., 1 ms, corresponds to one subframe.

In some implementations, the physical channels present in the physical layers of the transmitter and the receiver may be classified into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. As shown in the examples of FIGS. 3 and 4, for both the control plane (FIG. 3) and the user plane (FIG. 4), the second layer includes a MAC layer and a radio link control (RLC) layer.

The MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

As shown in FIG. 4, in the user plane, the second layer also includes a Packet Data Convergence Protocol (PDCP) layer which performs a header compression function of reducing the size of an IP packet header which has a relatively large size and contains unnecessary control information. This may enable efficiently transmission of an IP packet (e.g., an IPv4 or IPv6 packet) in a radio interval having a narrow bandwidth. In addition, in some implementations, the PDCP layer also performs a security function, which consists of ciphering for preventing a third party from monitoring data and integrity protection for preventing data manipulation by a third party.

As shown in FIG. 3, a Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. An RB represents a service provided by the second layer to ensure data transfer between UE 300 and the radio access network (e.g., E-UTRAN).

If an RRC connection is established between the RRC layer of the UE 300 and the RRC layer of a wireless network, the UE 300 is in the RRC Connected mode. Otherwise, the UE 300 is in the RRC Idle mode.

Hereinafter, description will be given of examples of the RRC state of the UE 300 and an RRC connection method. The RRC state refers to a state in which the RRC of the UE 300 is or is not logically connected with the RRC of the radio access network (e.g., E-UTRAN). The RRC state of the UE 300 having logical connection with the RRC of the radio access network is referred to as an RRC_CONNECTED state. The RRC state of the UE 300 which does not have logical connection with the RRC of the radio access network is referred to as an RRC_IDLE state. When the UE 300 is in the RRC_CONNECTED state and has an RRC connection, the radio access network may recognize presence of the UE 300 in a cell unit. Accordingly, the UE 300 may be efficiently controlled. On the other hand, the radio access network may not be able to recognize presence of a UE 300 which is in the RRC_IDLE state, in which case the UE 300 in the RRC_IDLE state may be managed by a core network in a tracking area (TA) which is an area unit larger than the cell. That is, for the UE 300 in the RRC_IDLE state, the presence or absence of the UE 300 may be recognized in an area unit larger than the cell. In order for the UE 300 in the RRC_IDLE state to be provided with a usual mobile communication service such as a voice service and a data service, the UE 300 may transition to the RRC_CONNECTED state. The TA is distinguished from another TA by a tracking area identity (TAI) thereof. In some implementations, UE 300 may configure the TAI through a tracking area code (TAC), which is information broadcast from a cell.

When the user initially turns on the UE 300, the UE 300 searches for a proper cell first. Then, the UE 300 establishes RRC connection in the cell and registers information thereabout in the core network. Thereafter, the UE 300 stays in the RRC_IDLE state. In some scenarios, the UE 300 staying in the RRC_IDLE state may select a cell (again) and check system information or paging information. This operation is referred to as "camping" on a cell. In some scenarios, only when the UE 300 staying in the RRC_IDLE state needs to establish RRC connection, does the UE 300 establish RRC connection with the RRC layer of the radio access network through the RRC connection procedure and transition to the RRC_CONNECTED state. The UE 300 staying in the RRC_IDLE state may establish an RRC connection in various scenarios. For example, the scenarios may include an attempt of a user to make a phone call, an attempt to transmit data, or transmission of a response message after reception of a paging message from the radio access network (e.g., E-UTRAN).

As shown in FIG. 3, a non-access stratum (NAS) layer may be provided over the RRC layer and performs functions such as session management and mobility management.

Hereinafter, an example of the NAS layer shown in FIG. 3 for the control plane will be described in further detail.

In some implementations, an eSM (evolved Session Management) belonging to the NAS layer performs functions such as default bearer management and dedicated bearer management to control a UE 300 to use a packet switching (PS) service from a network. The UE 300 is assigned a default bearer resource by a specific packet data network (PDN) when the UE 300 initially accesses the PDN. In this case, the network allocates an available IP to the UE 300 to allow the UE 300 to use a data service. The network also allocates QoS of a default bearer to the UE 300. In some implementations (e.g., implementations that are compatible with LTE), two kinds of bearers may be supported. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

In some scenarios, a bearer that is allocated to the UE 300 by the network may be an evolved packet service (EPS) bearer. When the EPS bearer is allocated to the UE 300, the network assigns an ID, called an EPS bearer ID. One EPS bearer has QoS characteristics of a maximum bit rate (MBR) and/or a guaranteed bit rate (GBR).

Figure 5:
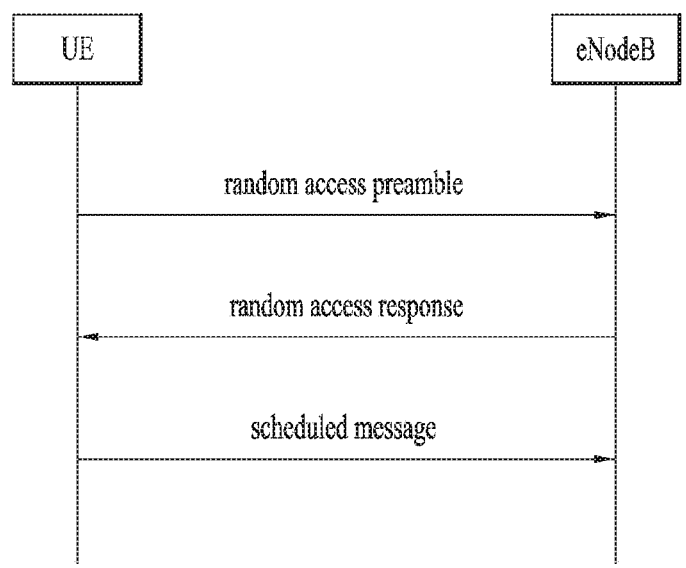
FIG. 5 is a diagram illustrating an example of a signal flow for a random access procedure.

FIG. 5 is a flowchart illustrating an example of a random access procedure.

In this example, the random access procedure 500 may be used for a UE 502 to obtain UL synchronization with a base station 504 (e.g., an eNB) or to be assigned a UL radio resource.

In some implementations, the UE 502 receives a root index and a physical random access channel (PRACH) configuration index from the base station 504. For example, each cell in the wireless network has 64 candidate random access preambles defined by a Zadoff-Chu (ZC) sequence. The root index is a logical index used for the UE 502 to generate 64 candidate random access preambles.

In some implementations, transmission of a random access preamble is limited to a specific time and frequency resources for each cell. The PRACH configuration index indicates a specific subframe and preamble format in which transmission of the random access preamble is possible.

The UE 502 transmits a randomly selected random access preamble to the base station 504. For example, the UE 502 selects a random access preamble from among 64 candidate random access preambles and the UE 502 selects a subframe corresponding to the PRACH configuration index. The UE 502 transmits the selected random access preamble in the selected subframe to the base station 504.

Upon receiving the random access preamble, the base station 504 sends a random access response (RAR) to the UE 502. In some implementations, the RAR is detected by the UE 502 in two steps. First, the UE 502 may detect a PDCCH masked with a random access (RA)-RNTI. The UE 502 then receives an RAR in a MAC (medium access control) PDU (protocol data unit) on a PDSCH indicated by the detected PDCCH.

Figure 6:
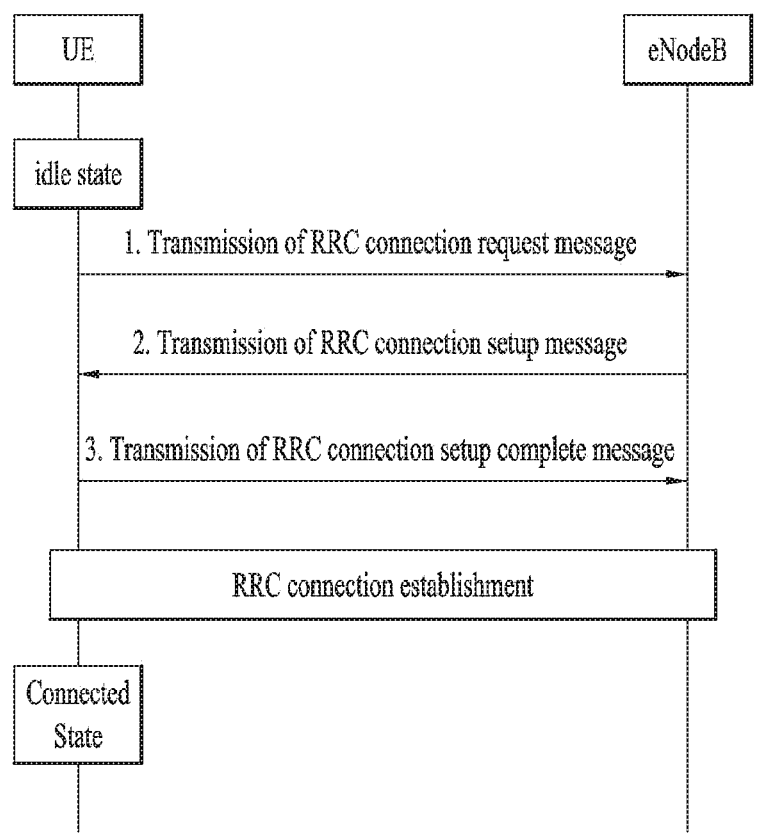
FIG. 6 is a diagram illustrating an example of a signal flow for a radio resource control (RRC) connection setup procedure.

FIG. 6 illustrates an example of a connection procedure in a radio resource control (RRC) layer.

In the RRC connection procedure 600 of this example, the RRC state is set according to whether or not RRC connection is established. An RRC state indicates whether or not an entity of the RRC layer of a UE 602 has logical connection with an entity of the RRC layer of a base station 604 (e.g., an eNodeB). An RRC state in which the entity of the RRC layer of the UE 602 is logically connected with the entity of the RRC layer of the base station 604 is called an "RRC connected" state. An RRC state in which the entity of the RRC layer of the UE 602 is not logically connected with the entity of the RRC layer of the base station 604 is called an "RRC idle" state.

A UE 602 in the RRC connected state has an RRC connection, and thus a radio access network (e.g., E-UTRAN) may recognize the presence of the UE 602 in a cell unit. Accordingly, in such scenarios, the UE 602 may be efficiently controlled. On the other hand, the radio access network may not be able to recognize the presence of a UE 602 which is in the RRC idle state. In such scenarios, the UE 602 in the RRC idle state may be managed by a core network in a tracking area unit, which is an area unit larger than the cell. In some scenarios, the tracking area is a unit of a set of cells. As such, for a UE 602 which is in the RRC idle state, the presence or absence of the UE 602 may be recognized only within a larger area unit. Thus, in some implementations, in order for the UE 602 in the RRC idle state to be provided with mobile communication services, such as a voice service and a data service, the UE 602 may transition to the RRC connected state.

In some implementations, when the user initially activates the UE 602, the UE 602 searches for a proper cell, and then proceeds to the RRC idle state. When the UE 602 in the RRC idle state establishes an RRC connection, the UE 602 establishes an RRC connection with the RRC layer of the base station 604 through the RRC connection procedure, and then transitions to the RRC connected state.

A UE 602 in the RRC idle state may establish an RRC connection in various scenarios. For example, the scenarios may include an attempt of a user to make a phone call, an attempt to transmit data, or transmission of a response message after reception of a paging message from the radio access network.

For the UE 602 in the RRC idle state to establish an RRC connection with the base station 604, the RRC connection procedure may be performed as described above. The RRC connection procedure may be broadly classified into transmission of an RRC connection request message from the UE 602 to the base station 604, transmission of an RRC connection setup message from the base station 604 to the UE 602, and transmission of an RRC connection setup complete message from the UE 602 to the base station 604, which are described in further detail below with reference to FIG. 6.

1) When the UE 602 in the RRC idle state desires to establish an RRC connection (for reasons such as an attempt to make a call, a data transmission attempt, or a response of the base station 604 to paging), the UE 602 transmits an RRC connection request message to the base station 604.

2) Upon receiving the RRC connection request message from the UE 602, the base station 604 accepts the RRC connection request of the UE 602 (provided that radio resources are sufficient), and then transmits an RRC connection setup message, which is a response message, to the UE 602.

3) Upon receiving the RRC connection setup message, the UE 602 transmits an RRC connection setup complete message to the base station 604. In some implementations, only when the UE 602 successfully transmits the RRC connection setup message, does the UE 602 establish an RRC connection with the base station 604 and transitions to the RRC connected state.

Figure 7:
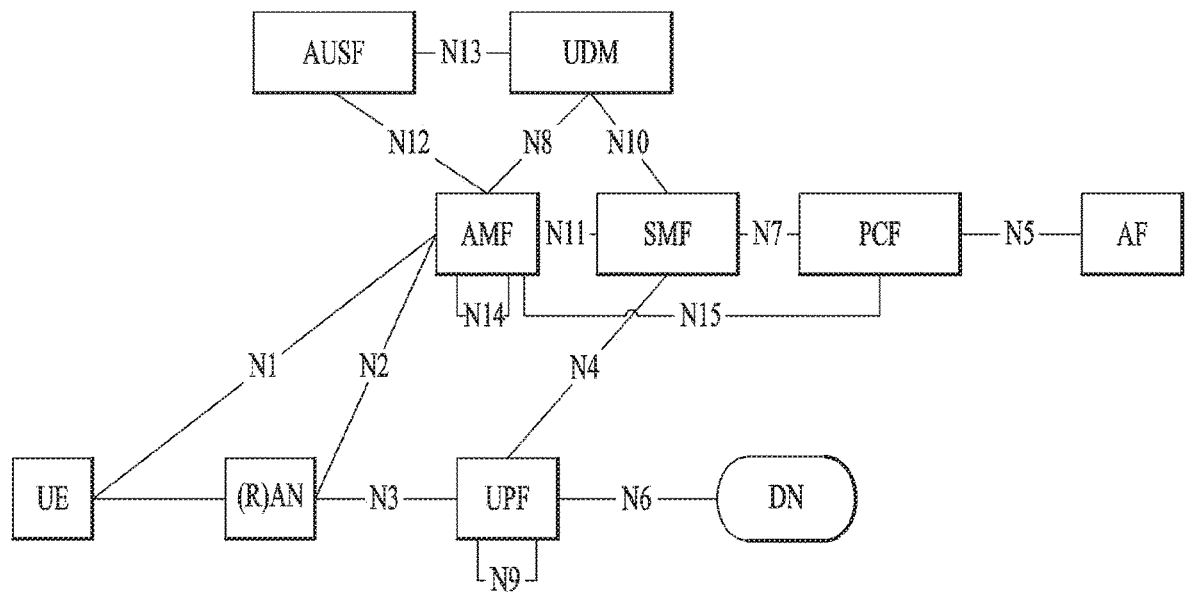
FIG. 7 is a diagram illustrating an example of a wireless communication system according to some implementations of the present disclosure.

FIG. 7 is a diagram illustrating an example of a wireless communication system according to some implementations of the present disclosure. In some implementations, the wireless communication system 700 may implement features that are compatible with a $5^{th}$ generation (5G) wireless communication system.

In the example of FIG. 7, the system 700 includes a core Access and Mobility Management function (e.g., AMF 702) and a Session Management Function (e.g., SMF 704) which are implemented in the core network (CN). The AMF 702 handles NAS interaction with a UE, such as UE 706, and mobility management (MM). The SMF 704 handles session management (SM). The SMF 704 also manages a user plane function (e.g., UPF 708) which is a gateway having user-plane functionalities, e.g., a gateway routing user traffic. One or more UPFs may be implemented between a radio access network (e.g., RAN 710) and a data network (e.g., DN 712), for routing user traffic. Further, a protocol data unit (PDU) session may be implemented as an association between a DN (e.g., DN 712) and a UE (e.g., UE 706), which provides a PDU connectivity service of an Ethernet type or an unstructured type as well as an IP type.

In some implementations, a Unified Data Management function (e.g., UDM 714) performs functionalities of a home subscriber server (HSS) and may provide relevant information, such as subscription information of UE 706, to AMF 702 and SMF 704. A policy control function (e.g., PCF 716) may perform functionalities of a policy and charging rules function (PCRF). The system 700 may also include an authentication server function (e.g., AUSF 718) and an application function (e.g., AF 720).

In some implementations, the system 700 may implement features that are compatible with 5G, and may comply with 3GPP technical standards TS 23.501, TS 23.502, and TS 23.503. For example, in some implementations, the RAN 710 may implement feature that are compatible with a next-generation radio access network (NG-RAN) architecture and may comply with 3GPP technical standard TS 38.300. In some scenarios, the system 700 may also support non-3GPP access, and may also comply with clause 4.2.8 of TS 23.501, which describes architectures and network elements for supporting non-3GPP access, and clause 4.12 of TS 23.502 which describes procedures for supporting non-3GPP access. As an example, WLAN access is a type of non-3GPP access, including trusted WLAN access and untrusted WLAN access. In some implementations, the AMF 702 of the system 700 performs registration management (RM) and connection management (CM) for non-3GPP access as well as 3GPP access.

Figure 8:
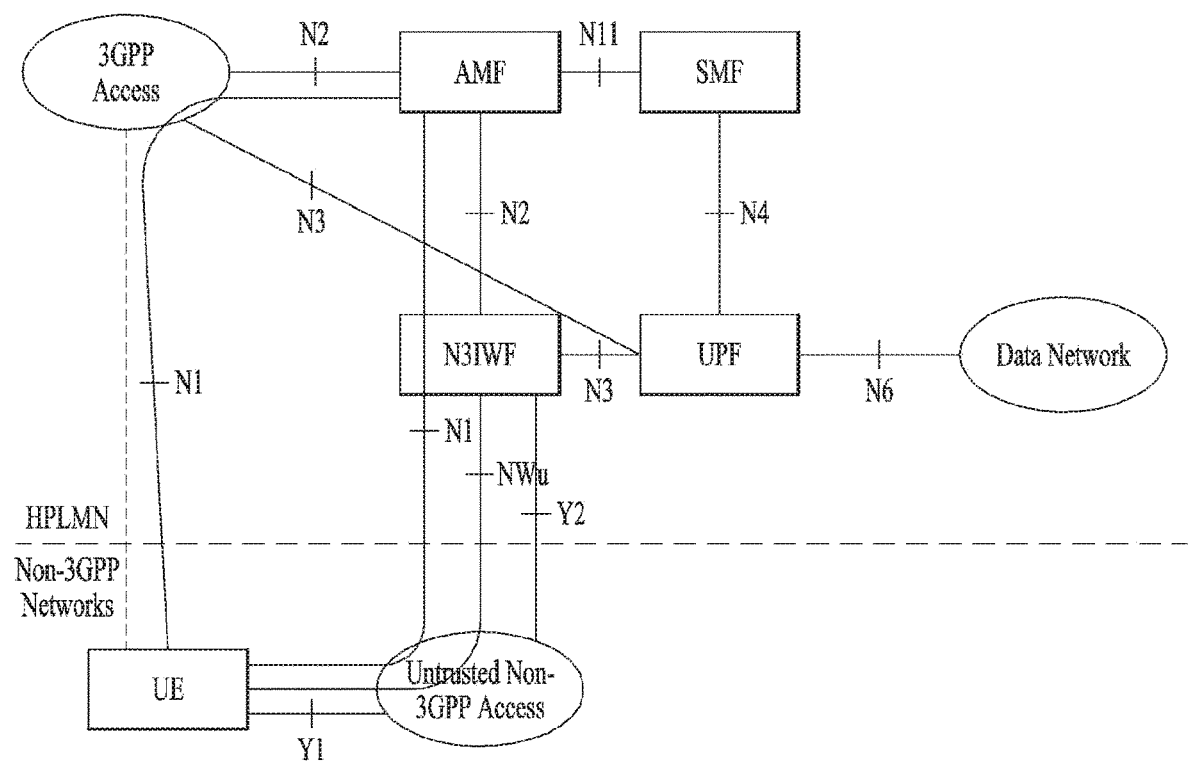
FIG. 8 is a diagram illustrating an example of a non-roaming architecture for non-3$^{rd}$ generation partnership project (non-3GPP) access.

FIG. 8 illustrates an example of a non-roaming architecture supporting non-3GPP access. In this example, the system 800 includes an AMF 802 that serves UE 804 for both 3GPP access 806 and non-3GPP access 808 in the same public land mobile network (PLMN). The single AMF 802 may provide various services, such as supporting authentication, MM, SM, etc. for the UE 804 that is registered via the two different accesses, in an integrated, efficient manner.

Figure 9:
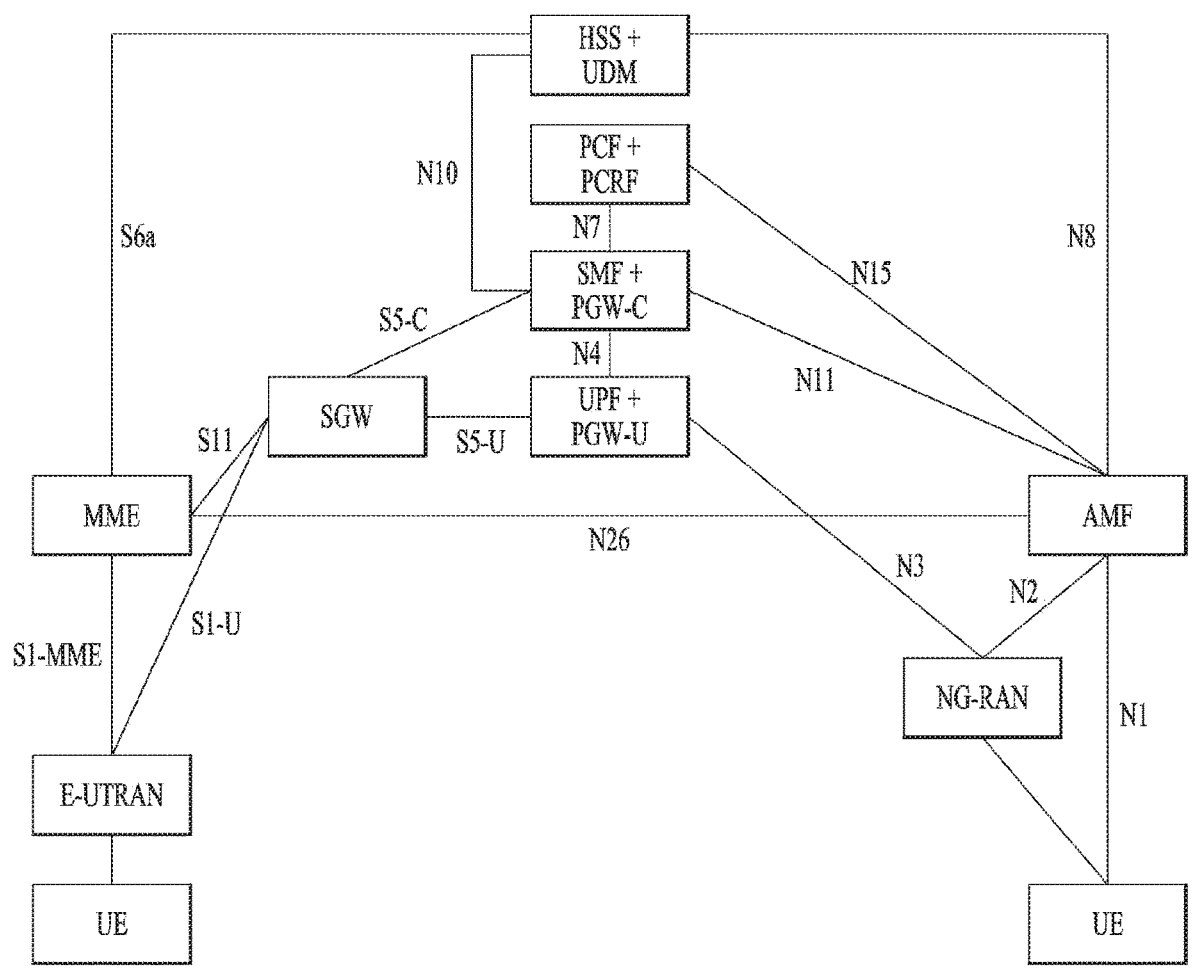
FIG. 9 is a diagram illustrating an example of a non-roaming architecture for interworking between a 5G system and an EPS.

FIG. 9 illustrates an example of a non-roaming architecture for interworking between two different networks, such as a 5G system and an EPS. In this example system 900, an interface, such as N26, may be implemented between an MME 902 and an AMF 904, that is, between CNs. The interface N26 may or may not be supported according to operator selection, depending on the implementation. In some implementations, the interworking between a 5G system and an EPS may comply with clause 4.3 of TS 23.501v15.0.0, which presents a detailed architecture for interworking between a 5G system and an EPS.

A wireless communication network may implement short message service (SMS). For example, SMS over NAS may be implemented by SMS transmission on the control plane. As compared to SMS over NAS, in some scenarios, SMS transmission on the user plane may be implemented by IP multimedia subsystem (IMS). In some implementations, SMS over NAS in the 5G core network (5GC) may comply with clause 4.4.2 (SMS over NAS) of TS 23.501v15.0.0 and clause 4.13.3 (SMS over NAS procedure) of TS 23.502v15.0.0. Particularly, the description of Registration procedures for SMS over NAS in clause 4.13.3.1 of TS 23.502v15.0.0 and mobile-terminated (MT) SMS over NAS in CM-IDLE state via 3GPP access in clause 4.13.3.6 of TS 23.502v15.0.0 are incorporated herein by reference.

Figure 10:
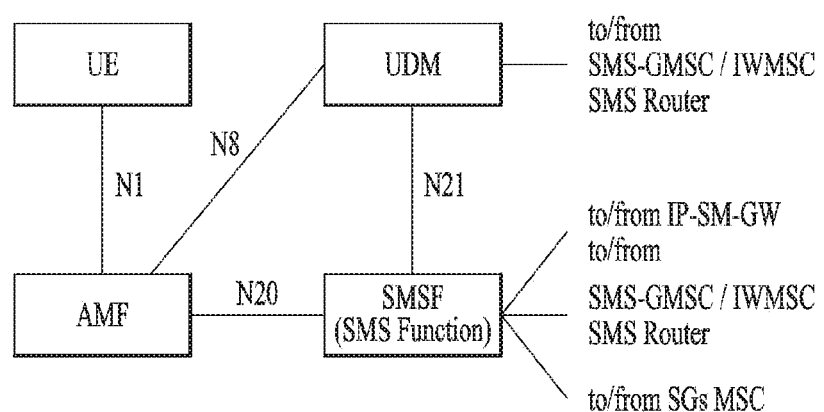
FIGS. 10, 11A, and 11B are diagrams illustrating examples of SMS transmission architectures.
Figure 11A:
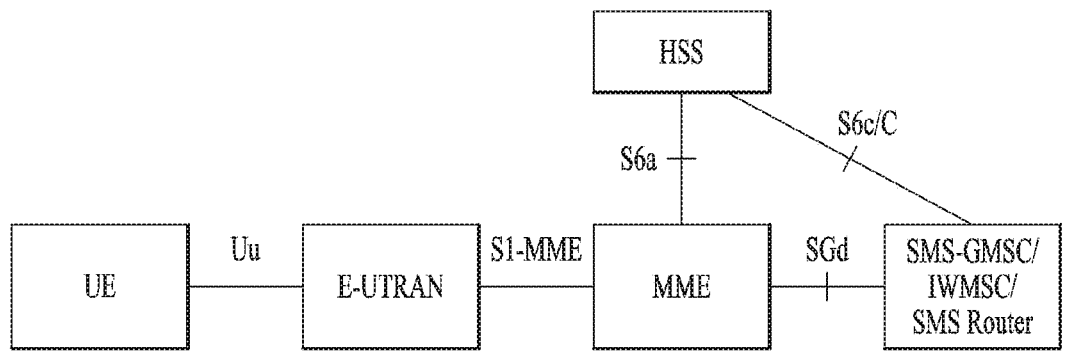
Figure 11B:
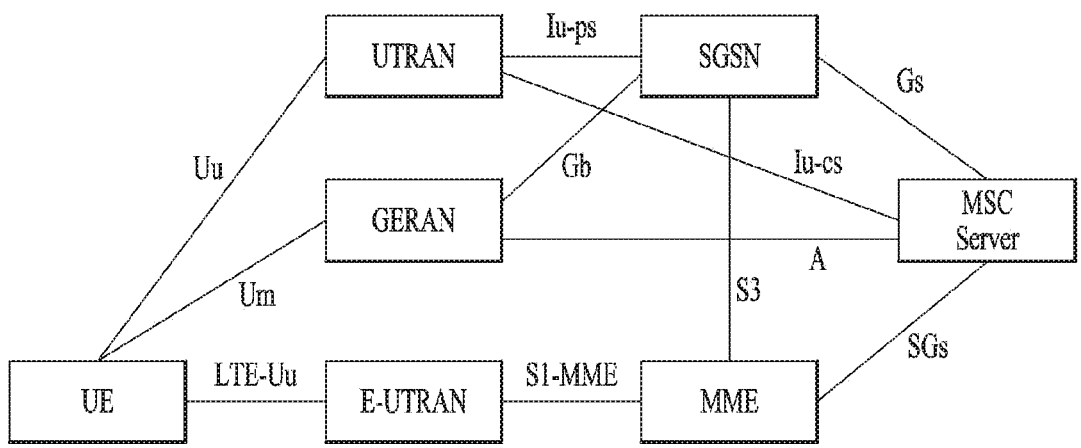

FIGS. 10, 11A, and 11B illustrate examples of wireless communication networks implementing SMS transmission architectures. In particular, FIG. 10 illustrates an example of a non-roaming system architecture for SMS over NAS, and FIGS. 11A and 11B illustrate examples of SMS transmission architectures that implement features of a mobility management entity (MME).

As shown in FIG. 10, a network 1000 may implement an SMS Function (e.g., SMSF 1002), which supports SMS over NAS by managing SMS subscription and delivery. SM messages may be transferred between the SMSF 1002 and a UE 1006 by an AMF (e.g., AMF 1004). In addition, a UDM (e.g., UDM 1008) may provide the SMSF 1002 with SM routing information for an SM of a UE 1006. The UDM 1008 may receive such SM routing information, for example, from a short message service-gateway mobile switching center (SMS-GMSC).

As shown in the examples of FIGS. 11A and 11B, a network 1100 (e.g., a core network such as an EPC) may implement SMS over NAS in two different scenarios. In FIG. 11A, the core network 1100 provides support for SMS functionality by MME 1102, and in FIG. 11B, the core network 1100 does not support SMS functionality by MME 1102.

In FIG. 11A, when an MME (e.g., MME 1102) supports SMS functionality, the MME 1102 may implement an SMS protocol stack, and SMS may be transmitted in the architecture illustrated in FIG. 11A. In some implementations, the MME 1102 may implement features that comply with technical standard TS 23.272, for example Annex C: SMS in MME in TS 23.272.

In FIG. 11B, when the MME 1102 does not support SMS functionality, the MME may not implement an SMS protocol stack, and SMS may be transmitted in the architecture illustrated in FIG. 11B. In this case, a mobile switching center (MSC) server 1104 (simply referred to herein as MSC 1104) may be implemented to support SMS functionality, for example by using an SGs interface. Such an architecture is referred to as "SMS over SGs." In some implementations, the MSC 1104 may implement features of SMS over SGs that comply with technical standard TS 23.272.

In some scenarios, an SMSF (e.g., SMSF 1002 in FIG. 10) may attempt mobile-terminated (MT) SMS delivery to a UE (e.g., UE 1006 in FIG. 10) and fail in the attempt. In such scenarios, if the SMSF supports an MT SMS domain selection function, then the SMSF may attempt SMS delivery to another entity (e.g., a serving node/entity of the UE, for the SMS). For example, in some implementations, the SMSF may implement features that comply with technical standard TS 23.502, clause 4.13.3.9 (Unsuccessful Mobile terminating SMS delivery attempt).

Based on the above description, operations of network nodes for SM delivery to a UE attached to a visited public land mobile network (V-PLMN) will be described below.

According to implementations of the present disclosure, a UDM (which may include a UDM and a HSS) may receive SM routing information for an SM of a UE from a short message service-gateway mobile switching center (SMS-GMSC), and transmit the SM routing information to a Home-SMSF (H-SMSF). The H-SMSF may perform domain selection for SM delivery. Further, the H-SMSF may attempt SM delivery to a target entity based on the domain selection, as described in further detail later. As such, the SM delivery may be attempted to a target entity in the domain selected by the H-SMSF. The SM may be a mobile terminated (MT) SM, and the target entity may be one of a V-SMSF(s), a SGs MSC, an MME, or an IP-SM-GW. The H-SMSF may be allocated by the UDM, in view of the absence of an SMSF registered to a Home-PLMN (H-PLMN) for the UE. In some implementations, the UE may be a roaming UE.

In the above description, the UE may be attached to two or more V-PLMNs, and each of the V-PLMNs may include an SMS serving entity (e.g., an SMS serving node or an SMS-related node). The SMS serving entity may be an SMSF, a SGs MSC, an MME, or an IP-SM-GW. That is, different SMS serving entities may belong to different V-PLMNs. In this case, there may be scenarios in which the SMS-related nodes in each of the V-PLMNs do not implement an interface between them. Therefore, in such scenarios, it would not be possible for a V-SMSF to perform MT SMS domain selection for a roaming UE, and MT SM delivery would be difficult.

Further description will be given with reference to FIGS. 12, 13A, and 13B.

Figure 12:
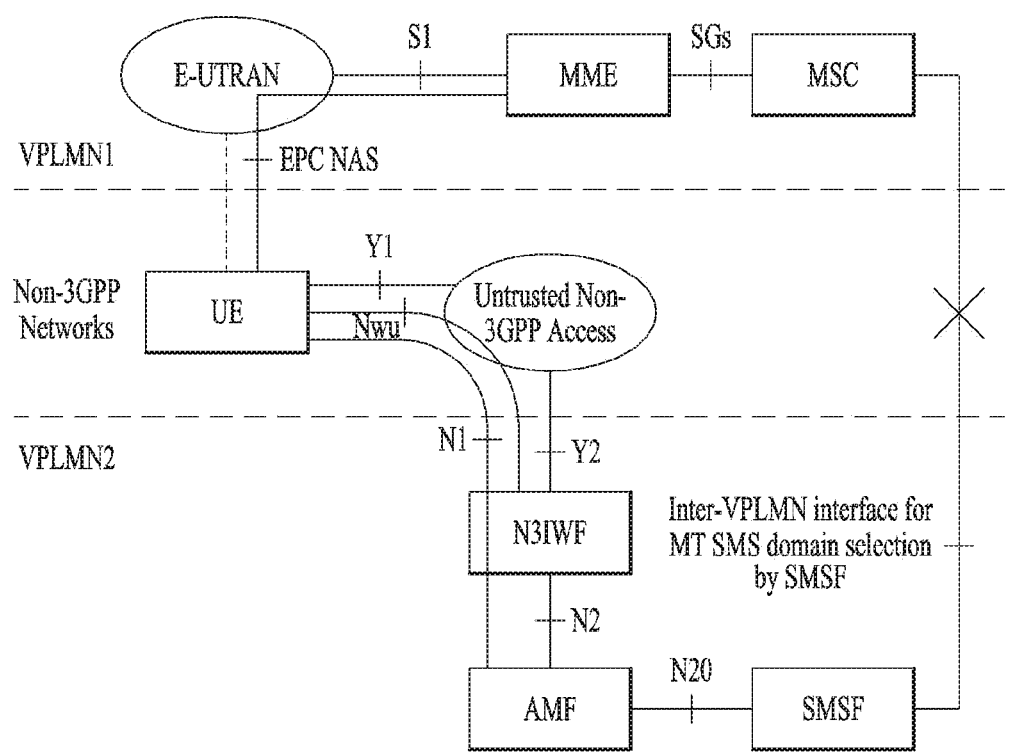
FIGS. 12, 13A, and 13B are diagrams illustrating examples of network situations to which implementations of the present disclosure are applicable.

FIG. 12 illustrates an example operation of a SGs MSC for SMS. In this example, a UE 1200 is attached to two different networks. In particular, UE 1200 is attached to an EPC via 3GPP access in VPLMN1 1202, and is registered to 5GC via non-3GPP access in VPLMN2 1204. Therefore, if an SMSF is needed for MT SMS domain selection, instead of an SMS-GMSC (e.g., if the SMSF performs domain selection), then an interface is required between the SMSF 1206 of VPLMN2 1204 and the SGs MSC 1208 of VPLMN1 1202. However, interfacing between VPLMNs for this type of SMS forwarding may not be possible.

Figure 13A:
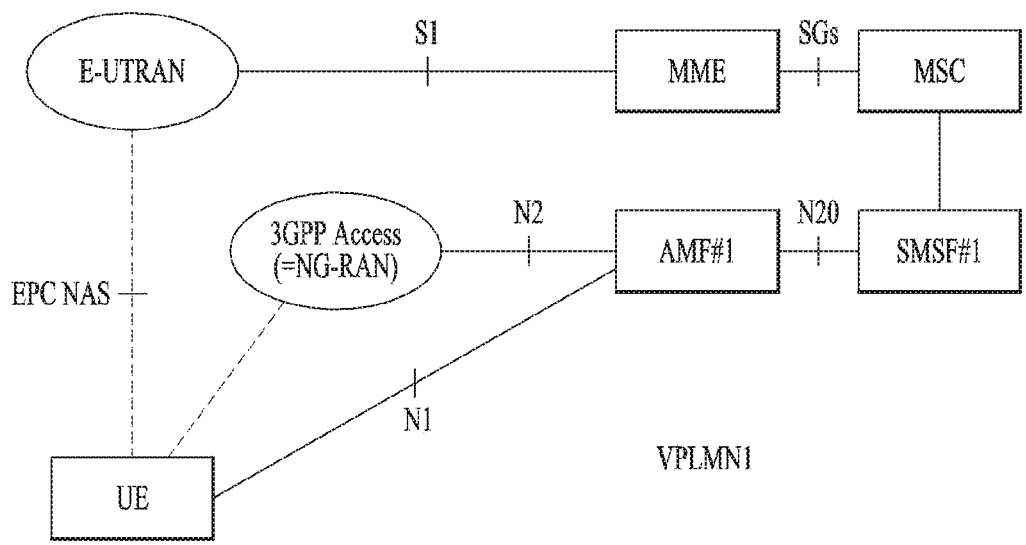

FIG. 13A illustrates an example of a network in which a UE 1300 is attached to an EPC of VPLMN1 1302 via 3GPP access (e.g., LTE), and registered to a 5GC of the same VPLMN1 1302 via 3GPP access (e.g., NR). In this example, an MSC 1304 and SMSF #1 1306, which handle SMS, both belong to the same PLMN, namely VPLMN1 1302. In such a scenario, it may be considered that the MSC 1304 and SMSF #1 1306 implement an interface 1308 between them. As such, even if the UE 1300 were to move out of the NR coverage of VPLMN1 1302, and enter the NR coverage of another VPLMN, and then register to the 5GC of that other VPLMN, then the UE 1300 would still be within the LTE coverage of VPLMN1 1302 and thus attached to the EPC in VPLMN1 1302.

Figure 13B:
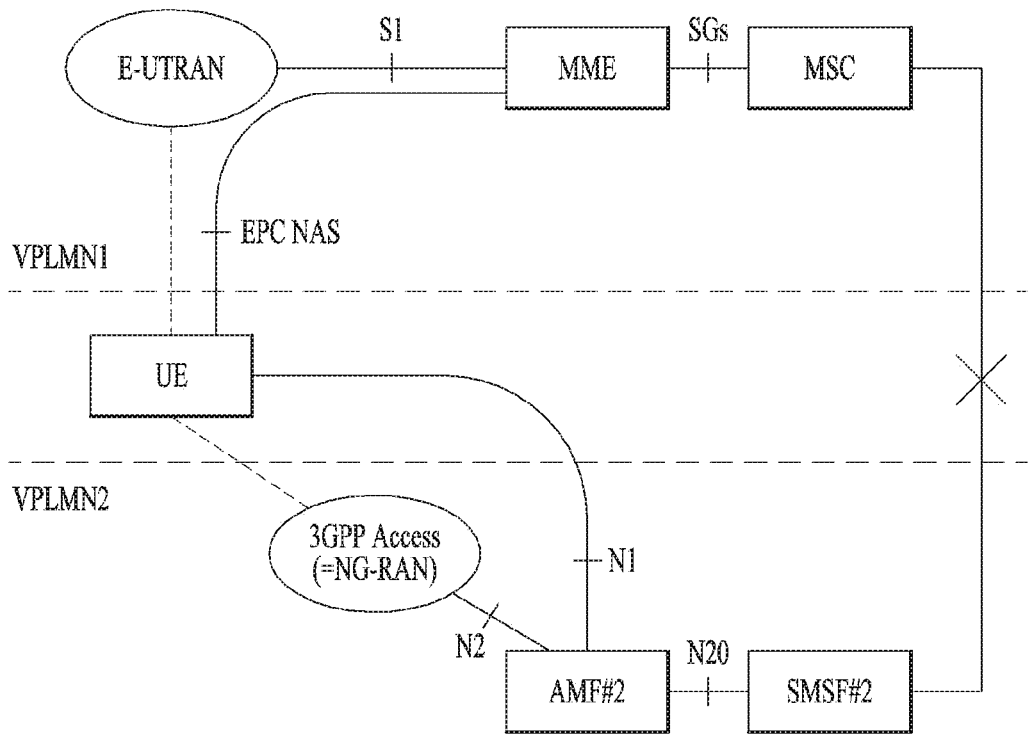

Such an example is illustrated in FIG. 13B. In this example, UE 1310 moves out of the NR coverage of VPLMN1 1312, and enters the NR coverage of VPLMN2 1314. In this scenario, the MSC 1316 and SMSF #2 1318, which handle SMS, each belong to different PLMNs, and therefore the MSC 1316 and SMSF #2 1318 are not likely to implement an interface between them.

As illustrated in the foregoing examples of FIGS. 12, 13A, and 13B, in scenarios where an MSC and an SMSF belong to different V-PLMNs, and a V-SMSF performs domain selection, if the V-SMSF attempts MT SM delivery to a UE via an AMF but fails, then the V-SMSF should attempt SM delivery to another SMS-related node. However, challenges may arise if there is no interface implemented between the MSC and the V-SMSF in the different PLMNs. The resulting failure in domain selection of the V-SMSF may therefore lead to failed MT SM delivery.

According to implements of the present disclosure, such challenges may be addressed by implementing a UDM that allocates an H-SMSF that performs domain selection for MT SM delivery.

In some implementations, the domain selection may be performed according to order information that is determined by one or more combinations of a plurality of pieces of domain order information. The plurality of pieces of domain order information may include, for example, (i) an order between CS domain and PS domain, (ii) an order between user plane and control plane, (iii) an order between EPC and 5GC, and/or (iv) an order between 3GPP access and non-3GPP access. Alternatively or additionally, the domain selection may be performed according to information about priorities of SMS serving entities.

Further details of the above description are provided below from the perspective of a relationship between network nodes with reference to FIG. 14.

Figure 14:
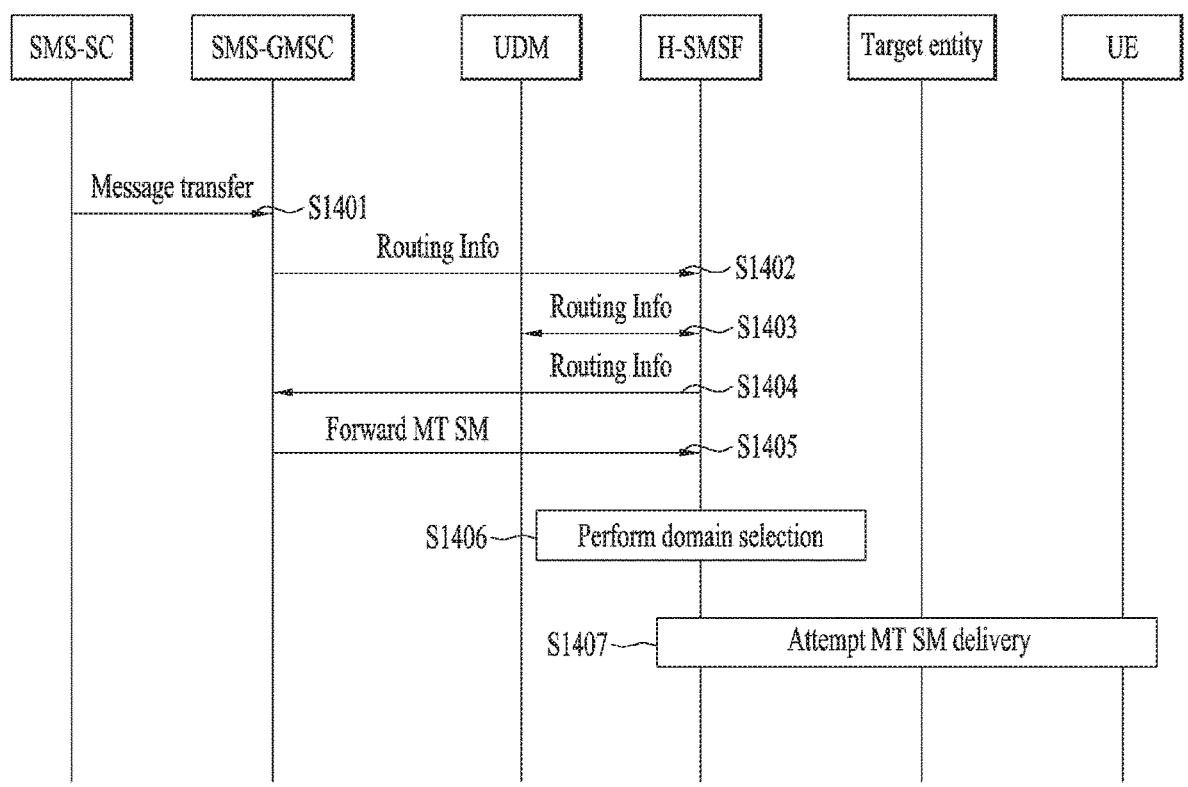
FIG. 14 is a diagram illustrating an example of signal transmission and reception between network nodes according to an implementation of the present disclosure.

FIG. 14 is a diagram illustrating an example of signal transmission and reception between network nodes according to implementations of the present disclosure. In particular, FIG. 14 shows an example of a Short Message (SM) termination procedure 1400 in a scenario that implements MT SMS domain selection by an H-SMSF.

In step S1401, an SMS-SC 1402 forwards a short message (e.g., SMS DELIVER or MT SMS) to an SMS-GMSC 1404.

In step S1402, the SMS-GMSC 1404 transmits Routing Info for requesting SMS routing information to a UDM 1406. If MT SMS domain selection by H-SMSF 1408 is supported, then the UDM 1406 checks whether there is any registered SMSF in an HPLMN for a UE 1412. In the absence of any registered SMSF, the UDM 1406 assigns one H-SMSF (e.g., H-SMSF 1408) for the purpose of MT SMS domain selection, for example based on user subscription or a configuration. Continuing in step S1402, the UDM 1406 then forwards the request of the SMS-GMSC 1404 to the H-SMSF 1408. Although it has been described herein that if MT SMS domain selection by H-SMSF 1408 is supported, then the UDM 1406 performs the proposed operation, the proposed operation may be performed at other times or in consideration of an operator policy, a configuration, or subscriber information.

As discussed above, in step S1402, the UDM 1406 forwards the request of the SMS-GMSC 1404 to the H-SMSF 1408. If there is a registered SMSF for the UE 1412, which belongs to the H-PLMN, then the registered SMSF is the H-SMSF 1408. By contrast, if there is no registered SMSF for the UE 1412, which belongs to the H-PLMN, then the H-SMSF 1408 is the one assigned for the purpose of MT SMS domain selection in the previous step.

In step S1403, the UDM 1406 returns an address of a current serving node (e.g., a V-SMSF(s), one of an SGs MSC and an MME, and/or an IP-SM-GW) for SMS delivery to the H-SMSF 1408 to deliver the SM in a CS/PS domain. In the absence of a registered H-SMSF for the UE 1412, the UDM 1406 may transmit SMS-related subscriber information in the message that returns the address, or separately to the H-SMSF 1408. The SMS-related subscriber information may include, for example, SMS parameters subscribed for SMS service such as SMS teleservice and an SMS barring list.

Upon receipt of the SMS-related subscriber information, the H-SMSF 1408 performs an operation corresponding to the SMS-related subscriber information before performing the MT SMS domain selection, e.g., forwarding the MT SMS. For example, the operation may be SMS barring check, or determining whether a subscriber has been authorized to use SMS (e.g., check in operator determined barring settings). The UDM 1406 may indicate an access type (e.g., 3GPP access, non-3GPP access, or both) served by the V-SMSF to the H-SMSF 1408.

In step S1404, the H-SMSF 1408 returns an address (e.g., only a single address, namely its own address) as routing information to the SMS-GMSC 1404. In some implementations, instead of the H-SMSF 1408, the UDM 1406 may provide information about the H-SMSF address to the SMS-GMSC 1404.

In some implementations, steps S1403 and S1404 may be performed at the same time, and/or step S1405 may precede steps S1403 and S1404.

In step S1405, the SMS-GMSC 1404 forwards the short message (SMS DELIVER) to the H-SMSF 1408.

In step S1406, the H-SMSF 1408 executes the domain selection function to determine a preferred domain for message delivery, e.g., according to an operator policy and user preferences. After the H-SMSF 1408 performs the domain selection, in some implementations, all available domains are arranged according to prioritization of the H-SMSF 1408.

In step S1407, the H-SMSF 1408 attempts MT SM delivery to a target entity 1410 according to a priority list until the delivery is successful or the delivery is attempted to all available domains. If the first delivery attempt is failed and the error is attributed to lack of the memory capacity of the UE 1412, then the H-SMSF 1408 transmits a delivery report (e.g., SMS-DELIVER-REPORT) again to the SMS-GMSC 1404.

If the H-SMSF 1408 has been activated by an AMF due to the registration of the UE 1412 to the 5GC, then the H-SMSF 1408 may attempt MT SMS delivery to an SMS serving node(s) provided by the UDM 1406, including MT SMS delivery through the AMF. For example, this transmission may be performed by attempts that are made until the MT SMS delivery is successful. In some implementations, the registration procedures may implement features that are compatible with technical standard TS 23.502, clause 4.13.3.1 "Registration procedures for SMS over NAS."

If the H-SMSF 1408 has not been activated by an AMF due to the registration of the UE 1412 to the 5GC, then in some implementations this may correspond to the H-SMSF 1408 having been activated/involved for MT SMS domain selection. In such scenarios, the H-SMSF 1408 may attempt MT SMS delivery to the SMS serving node(s) provided by the UDM 1406. For example, this transmission may be performed by attempts that are made until the MT SMS delivery is successful.

If the SMSF is a serving node registered for the purpose of SMS for the UE, then an AMF in an H-PLMN serving the UE 1412 is one of target entities 1410. In some implementations, these operations may be implemented to comply with technical standard TS 23.502, clause 4.13.3.1, step 7a.

In such scenarios, MT SM delivery is performed to the AMF, for example, in compliance with technical standard TS 23.502, clauses 4.13.3.6, 4.13.3.7, and 4.13.3.8.

The V-SMSF(s), one of the SGs MSC and the MME, and/or the IP-SM-GW may be the target entity 1410. In some implementations, the H-SMSF 1408 delivers the short message (SM) to the target entity 1410 in a manner similar to SM delivery from an IP-SM-GW to an MSC, SGSN, MME or SMSF, for example, in compliance with technical standard TS 23.204, clause 6.5a.

Thereafter, according to some implementations, the remaining steps after successful or failed MT SM delivery may be performed in a manner that complies with technical standard TS 23.040.

In some implementations, an order in which the H-SMSF 1408 selects MT SMS domains may be configured for the H-SMSF 1408. The order of selecting MT-SMS domains may be indicated to the H-SMSF 1408 by the UDM 1406, or may be provided in the form of subscriber information by the UDM 1406. Further, in some implementations, the order may include selection priority information that may reflect an operator policy and/or user preferences. For example, the selection priority information may be provided in step S1403 of FIG. 14. If the H-SMSF 1408 has been activated by an AMF due to registration of the UE 1412 to the 5GC, then the SMSF may acquire the selection priority information during interaction with the UDM 1408, for example, in compliance with technical standard TS 23.502, clause 4.13.3.1, "Registration procedures for SMS over NAS."

The MT SMS domain selection by the H-SMSF 1408 may be performed according to order information that is determined by one or more combinations of a plurality of pieces of domain order information. For example, the plurality of pieces of domain order information may include (i) an order between CS domain and PS domain, (ii) an order between user plane and control plane, (iii) an order between EPC and 5GC, and/or (iv) an order between 3GPP access and non-3GPP access, and/or other types of domain order information. Details of different pieces of domain order information are discussed further below.

(i) Order Between CS Domain and PS Domain

In some implementations, transmission to the CS domain refers to transmission to an SGs MSC, and transmission to the PS domain refers to transmission to a node other than the SGs MSC.

(ii) Order Between User Plane and Control Plane

In some implementations, transmission on the user plane refers to transmission to an IP-SM-GW, and transmission on the control plane refers to transmission to a node other than the IP-SM-GW.

(iii) Order Between EPC (or EPS) and 5GC (or 5GS)

In some implementations, transmission to the EPC (or EPS) refers to transmission to an MME or SGs MSC, and transmission to the 5GC (or 5GS) refers to transmission to an AMF or V-SMSF.

(iv) Order Between 3GPP Access and Non-3GPP Access

In some implementations, if an H-SMSF has been activated as an SMS serving node for non-3GPP access of a UE, then transmission over non-3GPP access refers to transmission through an AMF. In this case, transmission to any other SMS serving node refers to transmission over 3GPP access. If the H-SMSF has not been activated as an SMS serving node for non-3GPP access of the UE, then transmission through a V-SMSF serving non-3GPP access based on serving access type information about the V-SMSF received from a UDM refers to transmission over non-3GPP access, and transmission to any other SMS serving node refers to transmission over 3GPP access.

(v) Order is Set Per SMS Serving Entity.

In some implementations, the H-SMSF attempts MT SMS delivery by selecting/determining an SMS serving entity in a descending order of priority.

(vi) SMS Serving Entity with Highest Priority

In some implementations, transmission is first attempted to a highest-priority SMS serving entity. If the transmission attempt fails, then transmission is attempted to the remaining entities in an order that is determined based on implementation.

In the case of roaming, the H-SMSF performs MT SMS domain selection for a roaming UE as well as a non-roaming UE.

For MT SMS domain selection, the H-SMSF may implement the following interfaces described below. In some implementations, other protocols, such as SGd, are used for MT SMS delivery.

Interface to/from SGs MSC: the SGs MSC may be located in the HPLM or in the VPLMN.

Interface to/from MME: the MME may be located in the HPLM or in the VPLMN.

Interface to/from IP-SM-GW: in some implementations, regardless of the MT SMS domain selection by the SMSF, this interface may be implemented for MT SMS domain selection by IP-SM-GW.

Interface to/from V-SMSF

In some implementations, an interface may be implemented between the H-SMSF and the V-SMSF, and a service-based interface may be implemented between them.

In some scenarios, MT SMS domain selection by the SMSF may be an optional function. In such scenarios, H-SMSF for a roaming UE may be implemented when MT SMS domain selection by SMSF is supported. As such, a system may implement the principle of "SMSF is selected in VPLMN, for roaming UE."

In some scenarios, the following two issues may be addressed by the implementations discussed above.

One of the issues is whether the H-SMSF is involved in mobile originating (MO) SMS delivery in the roaming scenario. In some implementations, if the V-SMSF is configured to manage MO SMS delivery to the SMS-IWMSC/SMS-SC, then the H-SMSF may not need to be involved in the MO SMS delivery.

In the roaming scenario, according to some implementations, the H-SMSF may not be involved in MO SMS delivery.

The other issue is under what conditions the H-SMSF is to be activated or involved, in the roaming case. Various conditions may be implemented, examples of which are discussed next.

Option 1: When the V-SMSF is activated, the H-SMSF is also activated.

For this option, an H-SMSF selection method may be considered similarly to H-SMF selection in home-routed roaming. For example, the same H-SMF selection for home routing in a PDU session for a UE registered to different PLMNs over 3GPP access and non-3GPP access may be implemented. In the above roaming scenario, according to some implementations, regarding the issue of whether the H-SMSF is to be activated or involved, although the H-SMSF is activated when the V-SMSF is activated, the H-SMSF may not need to be involved in MO SMS. Further, in some implementations, the H-SMSF may not need to be activated when an MME or an SGs MSC services SMS to the UE.

Option 2: When the UDM receives Send Routing Info for an SM message for MT SMS delivery from the SMS-GMSC, if MT SMS domain selection by H-SMSF is supported, then the UDM assigns one H-SMSF for MT SMS domain selection. For this option, the UDM may also perform a similar operation when the IP-SM-GW performs MT SMS domain selection, for example in compliance with technical standard TS 23.204, as described in clause 6.4 of TS 23.204.

Architecture to Support SMS Over NAS

FIGS. 15 to 19 are diagrams that illustrate examples of architectures that support SMS over NAS, according to implementations of the present disclosure.

Figure 15:
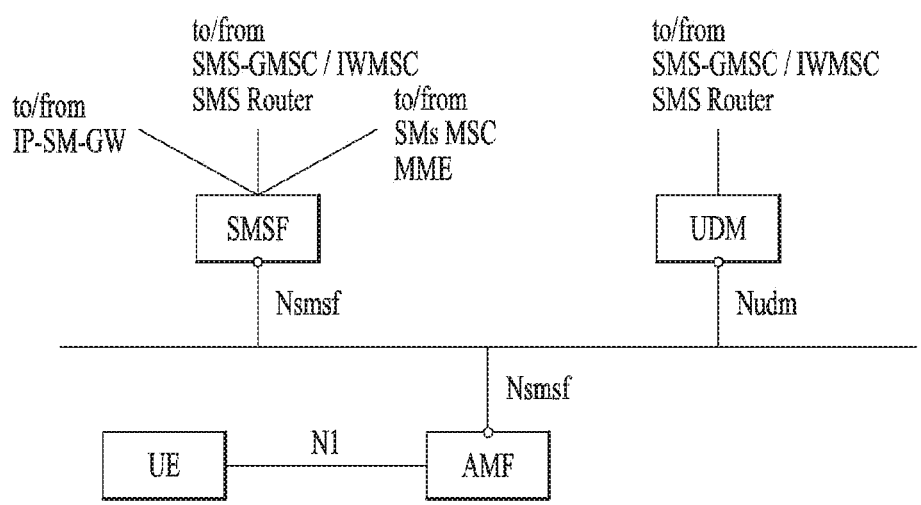
FIGS. 15 to 19 are diagrams that illustrate examples of architectures that support SMS over NAS, according to implementations of the present disclosure.

FIG. 15 shows an example of a non-roaming architecture to support SMS over NAS using the Service-based interfaces within the Control Plane.

Figure 16:
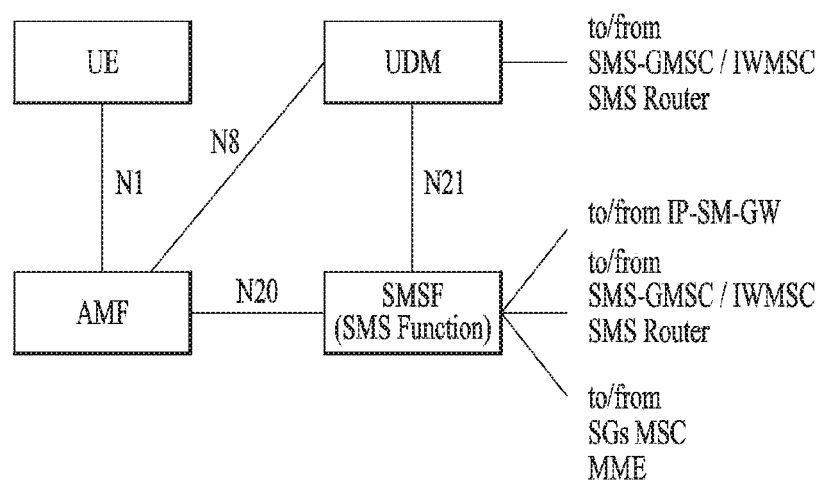

FIG. 16 shows an example of the non-roaming architecture to support SMS over NAS using a reference point representation that shows the interactions between services in the different network functions.

In some implementations, an SMS Function (SMSF) 1500/1600 may be connected to the SMS-GMSC/IWMSC/SMS Router via an interface. For example, the interface may be implemented with features that comply with technical standard TS 23.040.

The UDM 1502/1602 may be connected to the SMS-GMSC/IWMSC/SMS Router via an interface. For example, the interface may be implemented with features that comply with technical standard TS 23.040.

In some implementations, each UE 1504/1604 is associated with only one SMS

Function 1500/1600 in the registered PLMN.

In some implementations, SMSF re-allocation while the UE 1504/1604 is in the "RM REGISTERED" state may not be supported. If a serving AMF 1506/1606 is re-allocated for a given UE 1504/1604, then the source AMF 1506/1606 may include an SMSF identifier as part of UE context transfer to the new target AMF.

To support MT SMS domain selection by an H-SMSF, in some implementations, the H-SMSF may connect to, for example, IP-SM-GW, SGs MSC, MME and/or V-SMSF via an interface. For example, the interface may be implemented with features that comply with technical standard TS 23.040.

Figure 17:
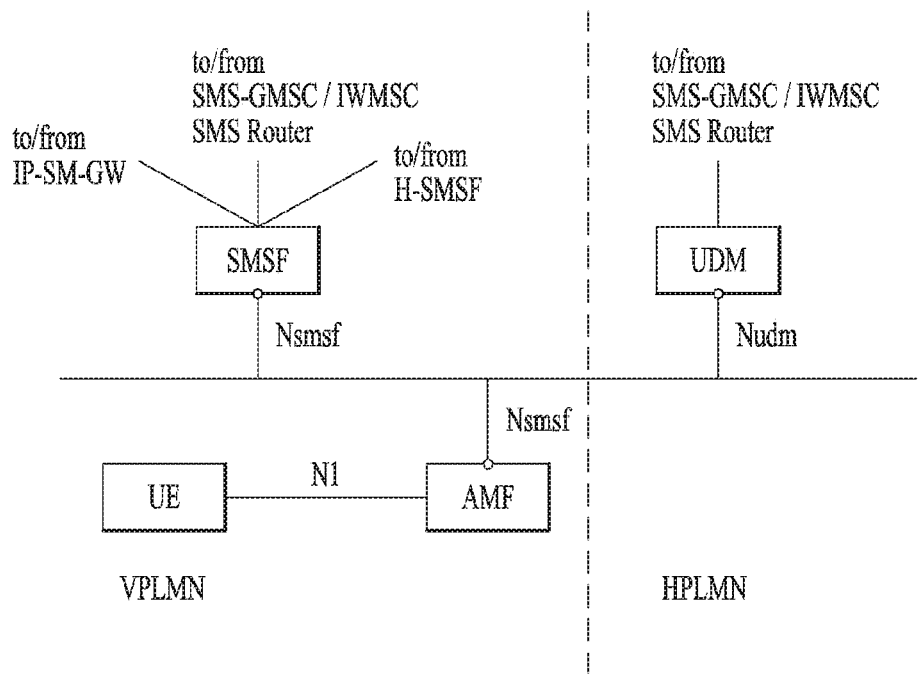

FIG. 17 shows an example of the roaming architecture to support SMS over NAS using the Service-based interfaces within the Control Plane.

Figure 18:
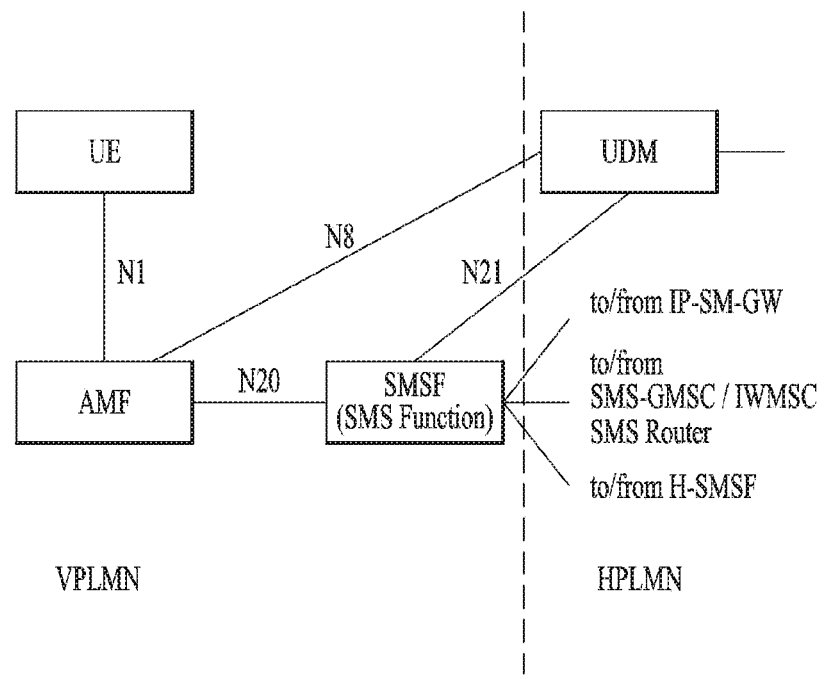

FIG. 18 shows an example of the roaming architecture to support SMS over NAS using a reference point representation that shows the interactions between services in the different network functions.

In some implementations, the following reference points, or interactions, may be implemented to support SMS over NAS.

N1: a reference point for SMS transfer between a UE 1704/1804 and AMF 1706/1806 via NAS.

The following reference points may be implemented by service-based interfaces:

N8: a reference point for SMS Subscription data retrieval between an AMF 1706/1806 and a UDM 1702/1802.

N20: a reference point for SMS transfer between an AMF 1706/1806 and an SMS Function (SMSF) 1700/1800.

N21: a reference point for SMS Management Subscription data retrieval between an SMSF 1700/1800 and a UDM 1702/1802.

In some implementations, MT SMS domain selection by an H-SMSF may be supported, in which case N21 is also used to activate the H-SMSF for the MT SMS domain selection for the roaming scenario.

Further description of the SMS Function (SMSF) is provided next.

In some implementations, the SMSF implements the following functionality to support SMS over NAS:
  SMS subscription checking.
  SM-RP/SM-CP with the UE. In some implementation, the SMSF may implement features in compliance with technical standard TS 24.011.
  Relaying the SM from the UE toward the SMS-GMSC/IWMSC/SMS-Router.
  Relaying the SM from the SMS-GMSC/IWMSC/SMS-Router toward the UE.
  SMS-related CDR.
  Lawful Interception.
  Interaction with the AMF and SMS-GMSC for notification procedures that the UE is unavailable for SMS transfer (e.g., notifying the SMS-GMSC to inform the UDM that the UE is unavailable for SMS).
  In scenarios where MT SMS domain selection by H-SMSF is supported, selecting SMS domain for (re-) attempting MT SM message delivery.
  Unsuccessful Mobile-Terminated SMS Delivery Attempt In some implementations, a procedure for unsuccessful mobile-terminated SMS delivery may be implemented as follows:
  If domain selection is not supported, then the SMSF sends a failure report to the SMS-GMSC. For example, the SMSF may implement features that comply with technical standard TS 23.040.
  After the first SMS-GMSC informs the UDM/HSS that the UE is not able to receive the MT SMS, the UDM/HSS sets an internal flag, such as an internal "Mobile Station Not Reachable Flag (MNRF)".
  If the UDM/HSS has not subscribed to a "UE Reachability Notification," then the UDM/HSS may initiate a subscription procedure. The UDM/HSS may implement features that comply with technical standard TS 23.502, clause 4.2.5.2.
  If the AMF detects UE activities, then the AMF notifies the UDM/HSS (e.g., with a "UE Activity Notification" which may comply with technical standard TS 23.502, clause 4.2.5.3). The UDM/HSS then clears its MNRF and alerts related SMSCs to retry MT SMS delivery.

Figure 19:
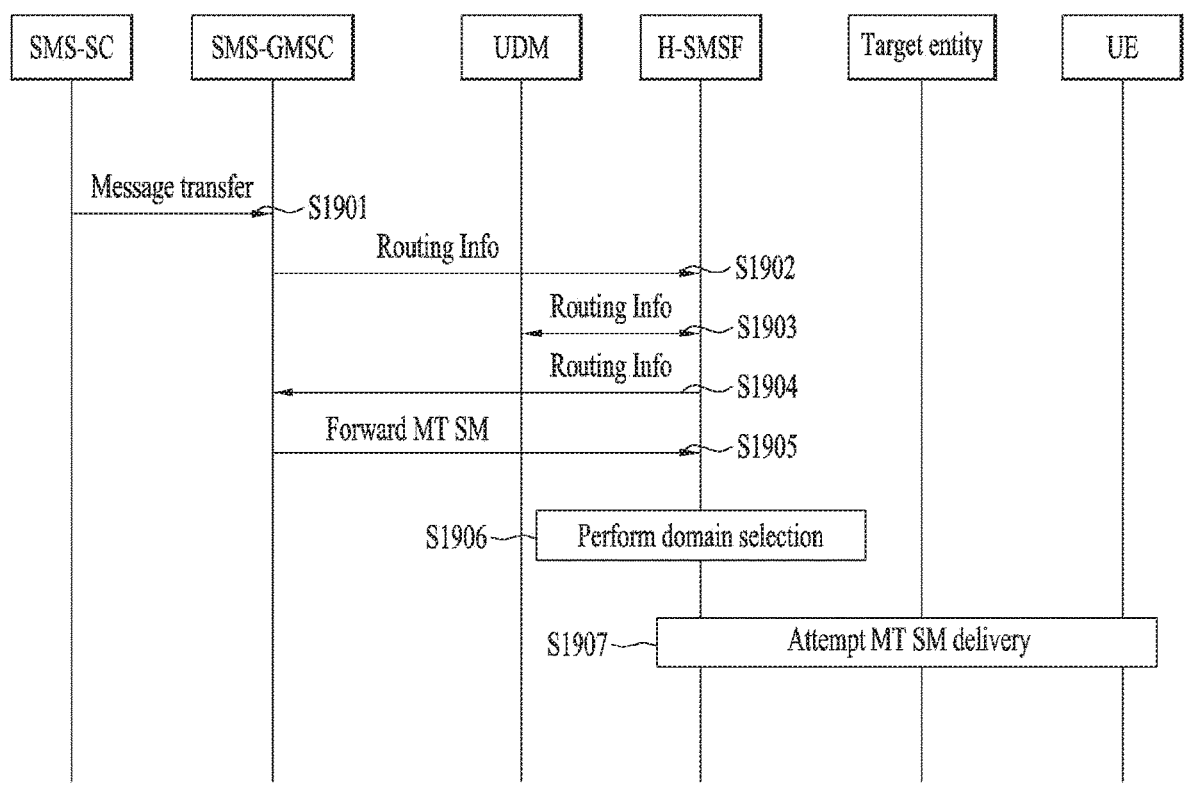

FIG. 19 shows an example of a Short Message (SM) termination procedure in a scenario that implements MT SMS domain selection by the H-SMSF. In this example, the steps of FIG. 19 correspond to those described with reference to FIG. 14, above. As such, the description of FIG. 19 incorporates the description of FIG. 14, replacing references to steps S140*x* with steps S190*x* herein.

Overview of Apparatuses to which the Disclosure is Applicable

Figure 20:
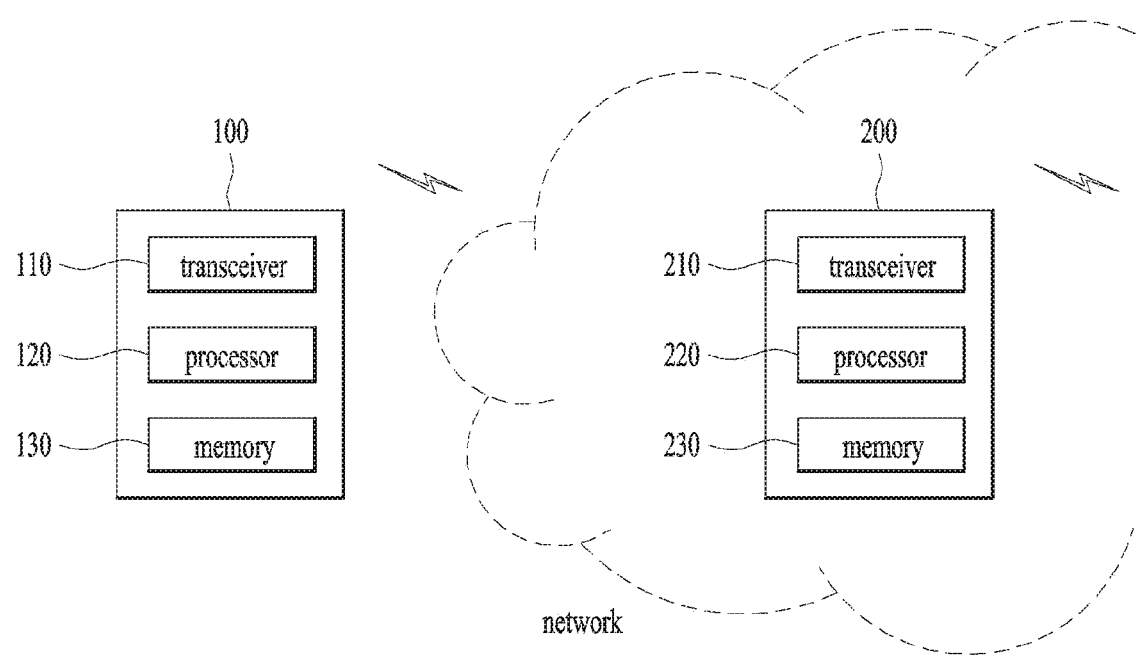
FIG. 20 is a block diagram illustrating examples of a user equipment (UE) and a network node according to an implementation of the present disclosure.

FIG. 20 is a block diagram illustrating examples of a UE and a network node according to some implementations of the present disclosure.

Referring to FIG. 20, a network node 2000 according to the present disclosure may include a transceiver 2100 (e.g., a radio frequency (RF) transceiver) that performs wireless communication. The network node 2000 may include at least one memory 2300 and at least one processor 2200 coupled with the at least one memory 2300. The transceiver 2100 may be configured to transmit various signals, data, and information to an external device, and receive various signals, data, and information from the external device. The network node 2000 may be connected to an external device, such as UE 2400, wiredly and/or wirelessly. The at least one processor 2200 may provide overall control to the operations of the network node 2000, and may be configured to compute and process information to be transmitted from the network node 2000 to the external device and information received from the external device in the network node 2000. The memory 2300 may store the computed and processed information for a predetermined time, and may include a component such as a buffer. Further, the processor 2200 may be configured to perform various network node operations as described in the present disclosure.

For example, the at least one processor 2200 may receive SM routing information for an SM of a UE from an SMS-GMSC, and transmit the SM routing information to an H-SMSF. The H-SMSF may perform domain selection for SM delivery.

Referring again to FIG. 20, a UE 2400 according to the present disclosure may include a transceiver 2500 for wireless communication. The UE 2400 may include at least one memory 2700 and at least one processor 2600 coupled with the at least one memory 2700. The transceiver 2500 may be configured to transmit various signals, data, and information to an external device, such as the network node 2000, and receive various signals, data, and information from the external device. The UE 2400 may be connected to the external device wiredly and/or wirelessly. The at least one processor 2600 may provide overall control to the operations of the UE 2400, and may be configured to compute and process information to be transmitted from the UE 2400 to the external device and information received from the external device in the UE 2400. The memory 2700 may store the computed and processed information for a predetermined time, and may include a component such as a buffer. Further, the processor 2600 may be configured to perform various UE operations as described in the present disclosure.

As is apparent from the above description, according to the present disclosure, if there is no interface between SM-related nodes in a plurality of V-PLMNs, a domain selection problem and a related message delivery problem may be overcome.

While various implementations of the present disclosure have been described in the context of a 3GPP system, they are applicable in the same manner to various mobile communication system.

The foregoing descriptions of various examples of the present disclosure may be applied independently or in combination of two or more implementations to the above-described specific configurations of the UE 2400 and the network node 2000, and a redundant description is not provided herein, for clarity.

The implementations of the present disclosure may be achieved by various techniques, for example, hardware, firmware, software, or a combination thereof.

In a hardware configuration, the methods according to exemplary implementations of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an implementation of the present disclosure may be implemented in the form of a module, a procedure, a function, etc. Software code may be stored in a memory unit and executed by a processor. The memory unit is located at the interior or exterior of the processor and may transmit and receive data to and from the processor via various known techniques.

Those skilled in the art will appreciate that the present disclosure may be carried out in other specific ways than those set forth herein without departing from the spirit and essential characteristics of the present disclosure. The above implementations are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of transmitting and receiving a short message (SM)-related signal by a unified data management (UDM) in a wireless communication system, the method comprising:
    receiving, by the UDM from a short message service-gateway mobile switching center (SMS-GMSC), SM routing information that is related to an SM of a roaming user equipment (UE); and
    transmitting, by the UDM to a Home Short Message Service Function (H-SMSF), the SM routing information, for domain selection by the H-SMSF for delivery of the SM,
    wherein the roaming UE is attached to two or more visited public land mobile networks (PLMNs).

2. The method according to claim 1, wherein the SM routing information is related to routing the SM to the roaming UE through an Access and Mobility Management function (AMF).

3. The method according to claim 1, wherein each of the two or more visited PLMNs comprises a respective SMS serving entity.

4. The method according to claim 3, wherein the SMS serving entity is one of a short message service function (SMSF), an SGs mobile switching center (MSC), a mobility management entity (MME), or an IP-short message-gateway (IP-SM-GW).

5. The method according to claim 1, wherein the delivery of the SM is configured to be attempted to a target entity of a domain that is selected by the H-SMSF.

6. The method according to claim 5, wherein the target entity is one of a V-SMSF, an SGs MSC, an MME, or an IP-SM-GW.

7. The method according to claim 1, wherein the domain selection by the H-SMSF is performed according to order information that is determined by a combination of one or more of a plurality of pieces of domain order information.

8. The method according to claim 7, wherein the plurality of pieces of domain order information comprises (i) an order between a circuit switched (CS) domain and a packet switched (PS) domain, (ii) an order between a user plane and a control plane, (iii) an order between an evolved packet core (EPC) and a 5th generation core (5GC), and (iv) an order between a 3rd generation partnership project (3GPP) access and a non-3GPP access.

9. The method according to claim 8, wherein the domain selection by the H-SMSF is performed according to priority information about an SMS serving entity.

10. The method according to claim 1, wherein the SM is a mobile terminated (MT) SM.

11. The method according to claim 1, wherein the H-SMSF is assigned by the UDM in absence of a registered SMSF in a Home PLMN (H-PLMN) for the roaming UE.

12. The method according to claim 1, wherein the UDM comprises a Home Subscriber Server (HSS).

13. A unified data management (UDM) configured to transmit and receive a short message (SM)-related signal in a wireless communication system, the UDM comprising:
- a transceiver;
- at least one processor; and
- at least one computer memory operably connectable to the at least one processor and storing instructions that, when executed, cause the at least one processor to perform operations comprising:
  - receiving, through the transceiver and from a short message service-gateway mobile switching center (SMS-GMSC), SM routing information that is related to an SM of a roaming user equipment (UE); and
  - transmitting, through the transceiver and to a Home Short Message Service Function (H-SMSF), the SM routing information, for domain selection by the H-SMSF for delivery of the SM,
  - wherein the roaming UE is attached to two or more visited public land mobile networks (PLMNs).

14. The UDM according to claim 13, wherein the domain selection by the H-SMSF is performed according to order information that is determined by a combination of one or more of a plurality of pieces of domain order information.

15. The UDM according to claim 14, wherein the plurality of pieces of domain order information comprises (i) an order between a circuit switched (CS) domain and a packet switched (PS) domain, (ii) an order between a user plane and a control plane, (iii) an order between an evolved packet core (EPC) and a 5th generation core (5GC), and (iv) an order between a 3rd generation partnership project (3GPP) access and a non-3GPP access.

16. The UDM according to claim 13, wherein each of the two or more visited PLMNs comprises a respective SMS serving entity.

17. The UDM according to claim 16, wherein the SMS serving entity is one of a short message service function (SMSF), an SGs mobile switching center (MSC), a mobility management entity (MME), or an IP-short message-gateway (IP-SM-GW).

18. The UDM according to claim 13, wherein the delivery of the SM is configured to be attempted to a target entity of a domain that is selected by the H-SMSF.

* * * * *